(12) United States Patent
Sakai et al.

(10) Patent No.: US 11,065,762 B2
(45) Date of Patent: Jul. 20, 2021

(54) ROBOT WORK SYSTEM AND METHOD OF CONTROLLING ROBOT WORK SYSTEM

(71) Applicant: Hitachi, Ltd., Tokyo (JP)

(72) Inventors: Ryo Sakai, Tokyo (JP); Nobutaka Kimura, Tokyo (JP)

(73) Assignee: Hitachi, Ltd., Tokyo (JP)

(*) Notice: Subject to any disclaimer, the term of this patent is extended or adjusted under 35 U.S.C. 154(b) by 271 days.

(21) Appl. No.: 16/289,742

(22) Filed: Mar. 1, 2019

(65) Prior Publication Data

US 2019/0270200 A1 Sep. 5, 2019

(30) Foreign Application Priority Data

Mar. 2, 2018 (JP) .............................. JP2018-037340

(51) Int. Cl.
*B25J 9/00* (2006.01)
*G06N 3/08* (2006.01)
*B25J 9/16* (2006.01)
*B25J 19/02* (2006.01)
*G05B 19/418* (2006.01)

(52) U.S. Cl.
CPC ............. *B25J 9/163* (2013.01); *B25J 9/0093* (2013.01); *B25J 9/161* (2013.01); *B25J 9/1633* (2013.01); *B25J 9/1661* (2013.01); *B25J 9/1664* (2013.01); *B25J 9/1697* (2013.01); *B25J 19/021* (2013.01); *G05B 19/4182* (2013.01); *G06N 3/084* (2013.01); *G05B 2219/39102* (2013.01);
(Continued)

(58) Field of Classification Search
CPC ...... G05B 2219/40007; G05B 19/4182; G05B 2219/40554; Y02P 90/02; G06N 3/084; G06N 3/0454; B25J 13/08; B25J 13/00
See application file for complete search history.

(56) References Cited

U.S. PATENT DOCUMENTS

2018/0107928 A1* 4/2018 Zhang ................. G06K 9/4628

FOREIGN PATENT DOCUMENTS

EP 3456485 A1 * 3/2019 ....... G05B 19/41865
JP 2017-30135 A 2/2017

OTHER PUBLICATIONS

Deng et al., "Robotic Manipulation Planning Using Dynamic RRT," Proc. of the 2016 IEEE Int. Conf. on Real-time Computing and Robotics, 2016, pp. 500-504.

* cited by examiner

*Primary Examiner* — Robert T Nguyen
*Assistant Examiner* — Dylan M Katz
(74) *Attorney, Agent, or Firm* — Crowell & Moring LLP

(57) ABSTRACT

An information processing apparatus obtains a plurality of combinations of a position of a work target candidate and a transport machine optimum control parameter which is a control parameter of the transport machine that maximizes performance of the work on a work target when the work target candidate is set as the work target, based on a captured image obtained by capturing an area including a plurality of the work target candidates transported by the transport machine, determines the work target from among the work target candidates based on the combinations, controls the transport machine based on the transport machine optimum control parameter of the determined work target, generates a control plan of the robot based on a position of the determined work target and the transport machine optimum control parameter of the work target and controls the robot according to the generated control plan.

11 Claims, 15 Drawing Sheets

(52) U.S. Cl.
CPC .............. *G05B 2219/40007* (2013.01); *G05B 2219/40554* (2013.01)

NON-WORK TARGET CANDIDATE j = 0 TO 6, 8 TO 15, 17, 19 TO 24

$r_{1,j} = 0.00 \text{m/s}, \quad r_{2,j} = (0.0, 0.0), \quad r_{3,j} = 0.0, \quad r_{4,j} = 1.0$ WORK TARGET CANDIDATE j = 7, 16, 18

$r_{1,7} = 0.75 \text{m/s}, \quad r_{2,7} = (0.3, 0.8), \quad r_{3,7} = 1.0, \quad r_{4,7} = 0.0$ $r_{1,16} = 0.25 \text{m/s}, \quad r_{2,16} = (0.2, 0.7), \quad r_{3,16} = 1.0, \quad r_{4,16} = 0.0$ $r_{1,18} = 0.50 \text{m/s}, \quad r_{2,18} = (0.8, 0.6), \quad r_{3,18} = 1.0, \quad r_{4,18} = 0.0$ TRANSPORTATION SPEED
0.5m/s

PERFORMANCE (WORK SUCCESS RATE)
○ R=0.90
⊕ R=0.60
● R=0.30

NON-WORK TARGET CANDIDATE j = 0 TO 6, 8 TO 15, 17, 19 TO 24

$r_{1,j} = 0.00$, $r_{2,j} = (0.0, 0.0)$, $r_{3,j} = 0.0$, $r_{4,j} = 1.0$

WORK TARGET CANDIDATE j = 7, 16, 18

$r_{1,7} = 0.90$, $r_{2,7} = (0.3, 0.8)$, $r_{3,7} = 1.0$, $r_{4,7} = 0.0$ $r_{1,16} = 0.30$, $r_{2,16} = (0.2, 0.7)$, $r_{3,16} = 1.0$, $r_{4,16} = 0.0$ $r_{1,18} = 0.90$, $r_{2,18} = (0.8, 0.6)$, $r_{3,18} = 1.0$, $r_{4,18} = 0.0$

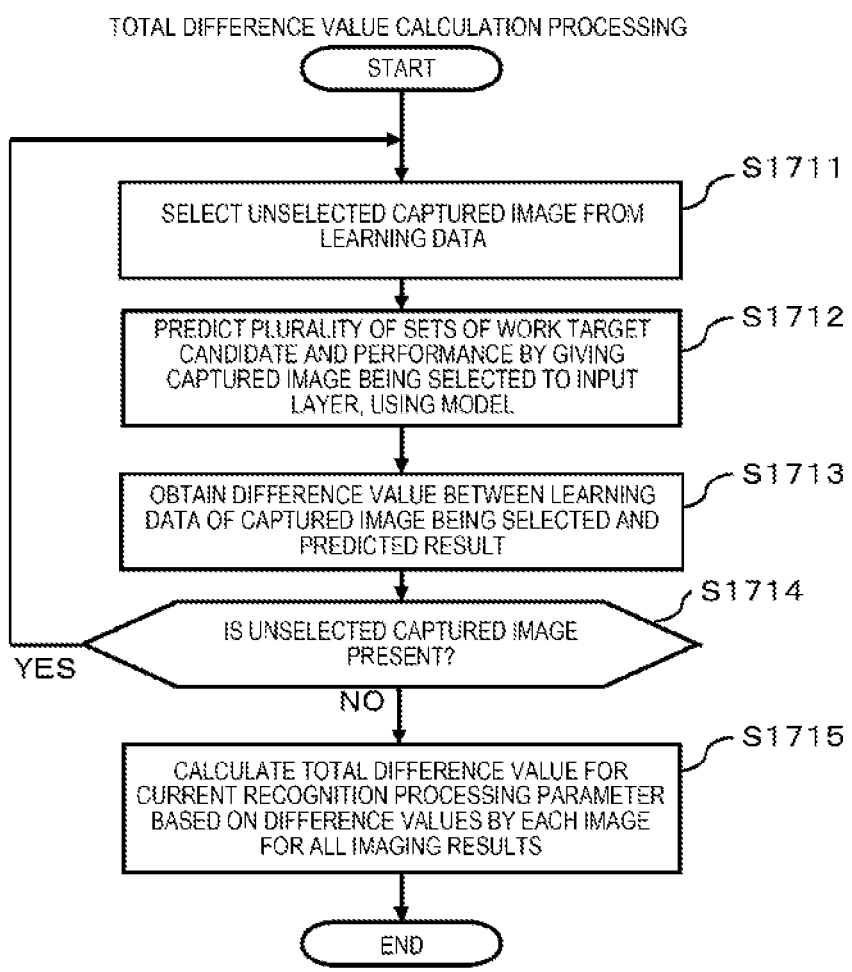

ROBOT WORK SYSTEM AND METHOD OF CONTROLLING ROBOT WORK SYSTEM

CROSS-REFERENCE TO RELATED APPLICATION

This application claims priority pursuant to 35 U.S.C. § 119 from Japanese Patent Application No. 2018-037340, filed on Mar. 2, 2018, the contents of which is incorporated herein by reference in its entirety.

BACKGROUND

Technical Field

The present invention relates to a robot work system and a method of controlling a robot work system.

Background Art

In JP-A-2017-30135, it is described that "a machine learning device for learning an operation of a robot that takes out a workpiece by a hand portion from a plurality of disorderly placed workpieces including a bulky state is disclosed. The machine learning device includes a state quantity observation unit that observes a state quantity of a robot including output data of a three-dimensional measurement device for acquiring a three-dimensional map for each workpiece, an operation result acquisition unit that acquires a result of a takeout operation of the robot for taking out the workpiece by the hand portion, and a learning unit that receives an output from the state quantity observation unit and an output from the operation result acquisition unit and learns an operation amount including instruction data for instructing the robot to take out the workpiece in association with the state quantity of the robot and the result of the takeout operation."

A system that automates work using a robot such as assembling of mechanical parts such as automobiles, assembling of electric parts, and classification and sorting of goods (foods, chemicals, cosmetics, and the like) has been widely used for various purposes. In such a system, a transport machine such as a transport robot, a conveyor belt, and the like is often used in order to transport articles such as parts and goods to a place where work by a robot is possible.

However, in the related art, in such a system, when work by the robot is performed, it is necessary to temporarily stop the transport machine in order to allow the robot to perform work, so that it takes time to work accordingly, which is a factor of deteriorating performance of the entire system.

Here, in JP-A-2017-30135 described above, it is described that learning of the optimum operation of the robot when taking out the workpiece that was placed in disorder is performed by machine learning without human intervention. However, there is no description on taking the operation of the transport machine into consideration in order to improve the performance of the entire system.

SUMMARY

The present invention has been made in view of such a viewpoint, and an object of the present invention is to provide a robot work system and a method of controlling the robot work system, which can improve performance when performing work by a robot using a transport machine.

One aspect of the present invention for achieving the object described above is a robot work system in which a robot performs work on a work target transported by a transport machine, and which includes an information processing apparatus including a processor and a storage device, in which the information processing apparatus comprises a recognition processing unit that obtains a plurality of combinations of a position of a work target candidate and a transport machine optimum control parameter which is a control parameter of the transport machine that maximizes performance of the work on a work target when the work target candidate is set as the work target, based on a captured image obtained by capturing an area including a plurality of the work target candidates transported by the transport machine, a work target determination unit that determines the work target from among the work target candidates based on the combinations, a transport machine control unit that controls the transport machine based on the transport machine optimum control parameter of the determined work target, and a robot control plan generation unit that generates a control plan of the robot based on a position of the determined work target and the transport machine optimum control parameter of the work target, and the recognition processing unit, the work target determination unit, the transport machine control unit, and the robot control plan generation unit are realized by reading out and executing a program stored in the storage device by the processor.

In addition, a problem to be solved which is disclosed by the present application and a method of solving the problem will be clarified from a section of detailed description of the invention and the accompanying drawings.

According to the present invention, it is possible to improve performance of a robot performing work using a transport machine.

BRIEF DESCRIPTION OF THE DRAWINGS

FIG. 17 is a flowchart for explaining total difference value calculation processing in the second realization method.

DETAILED DESCRIPTION OF THE EMBODIMENTS

Figure 1:
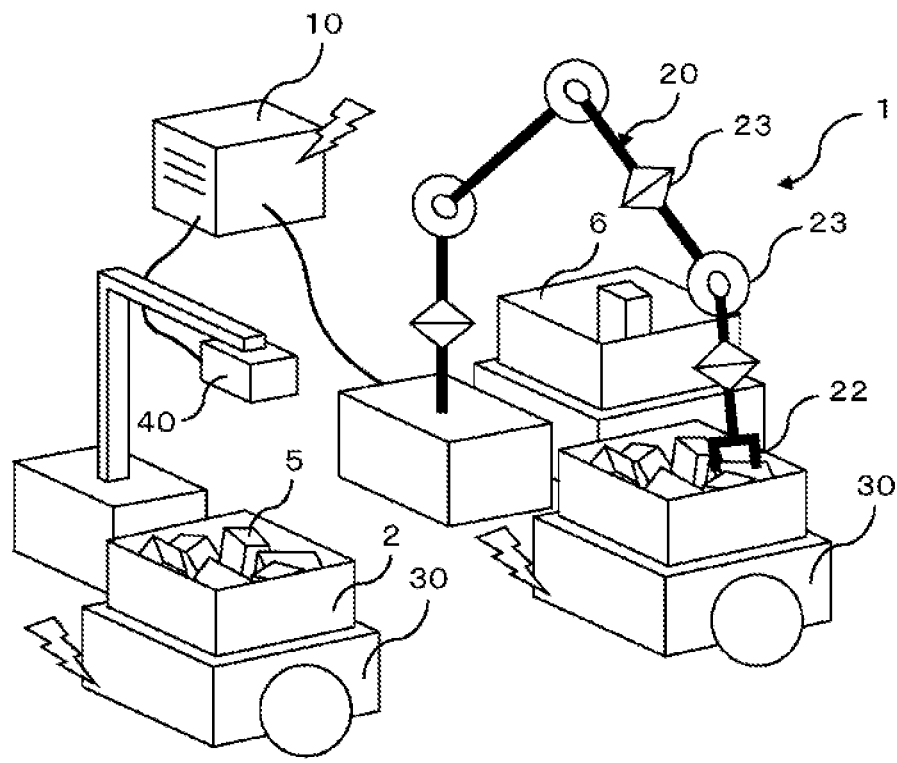
FIG. 1 is a diagram illustrating a schematic configuration of a first example of a robot work system 1.

Hereinafter, embodiments will be described with reference to the drawings. In the following description, the same or similar configuration will be denoted by the same reference numeral and redundant description thereof may be omitted.

In FIG. 1, a first example of a robot work system 1 is illustrated as an embodiment. As illustrated in FIG. 1, the robot work system 1 includes an information processing apparatus 10, a manipulator 20, a transport machine 30, and a capturing device 40. The information processing apparatus 10 communicably connects to the manipulator 20, the transport machine 30, and the capturing device 40, and transmits and receives data to and from these devices and controls these devices.

The robot work system 1 of the first example is a so-called picking system which takes out a plurality of articles 5 accommodated in a box 2 placed on the transport machine 30 one by one from the upper opening of the box 2 and places the articles 5 on a movement destination 6 (a work table, another box, a transportation conveyor, and the like). The robot work system 1 can also perform the work described above in a state in which the transport machine 30 is (moving) transporting (moving) the article.

The robot work system 1 determines one article 5 to be picked (work target) from among a plurality of articles 5 (work target candidates) accommodated in the box 2, and performs work (picking) on the determined article 5. The work is performed by the manipulator 20 gripping a gripping point position which is set on the surface of the article 5 in order to efficiently perform the work.

The manipulator 20 is, for example, a robot such as a robot arm or an industrial robot. Although FIG. 1 illustrates only one manipulator 20, the robot work system 1 may include a plurality of manipulators 20 communicably connected to the information processing apparatus 10.

The manipulator 20 includes, for example, an arm 21 formed of a multi-axis articulated type and a hand 22. A drive shaft of each joint portion 23 of the manipulator 20 is controlled by a drive mechanism (servo motor or the like) that can be controlled by the information processing apparatus 10. The manipulator 20 includes, for example, a six-axis force sensor between the tip of the arm 21 and the hand 22. The force sensor detects an overload applied to the hand 22. For example, in a case where the manipulator 20 takes out the bulk loaded article 5 from the box 2, when an overload that is caused by interference (collision or contact) of the article 5 gripped by the hand 22 or the hand 22 with the wall surface of the box 2 or another article 5 is detected, the information processing apparatus 10 controls the drive shaft of the manipulator 20 so as to release the detected overload.

The force sensor detects force exerted on the hand 22. When the hand 22 grips the article 5, the weight of the article 5 is exerted to the hand 22. For example, if a detection value of the force sensor exceeds a predetermined threshold value after picking of the article 5 is executed, the information processing apparatus 10 determines that the hand 22 is currently grasping the article 5. The information processing apparatus 10 may determine whether or not the hand 22 is currently grasping the article 5, by using another type of sensor such as a tactile sensor. The information processing apparatus 10 may determine whether or not the hand 22 is currently grasping the article 5, based on an image captured by a camera. In a case where the hand 22 is an adsorption type hand, the information processing apparatus 10 may determine whether or not the hand 22 is grasping the article 5 from a measurement result of a pressure gauge. Various types of hands 22 can be adopted as long as they can grasp the article 5. For example, the hand 22 may be a type that grips the article 5 by opening and closing a plurality of fingers, or a type that grips the article 5 by suctioning the article 5.

The transport machine 30 is, for example, a so-called transport robot such as an autonomous transport robot, an artificial intelligence (AI) transport robot, an autonomous traveling robot, or the like. For example, the transport machine 30 transports the box 2 (article 5) to a range (hereinafter, referred to as a capturable range) in which capturing by the capturing device 40 is possible and a range (hereinafter, referred to as a workable range) in which the manipulator 20 can work. The transport machine 30 can actively operate by autonomous control or passively operate under the control of a control signal sent from the information processing apparatus 10. The control is, for example, control of a moving speed of the transport machine 30, a moving direction of the transport machine 30, a moving route of the transport machine 30, and the like.

The information processing apparatus 10 can acquire information such as the current position, moving speed, moving direction, and the like of the transport machine 30 directly by the transport machine 30 itself or indirectly by the information processing apparatus 10 using a distance measurement sensor (a laser type distance measurement sensor, an ultrasonic type distance measurement sensor, a stereo camera, and the like), a positioning sensor (wireless LAN, a global positioning system (GPS)), a position detection sensor using a phase difference of a radio signal, an acceleration sensor, a gyro sensor, a magnetic sensor, an optical sensor, a millimeter wave radar.

The capturing device 40 is configured using, for example, an optical camera, a device capable of acquiring a distance image (time of flight (TOF) camera, a stereo camera, and the like), or the like. The capturing device 40 acquires a three-dimensional image (hereinafter, referred to as a captured image) including two-dimensional or depth (depth) information obtained by capturing a plurality of articles 5 accommodated in the box 2 and the box 2 from the upper opening side of the box 2. The capturing device 40 acquires the captured image when the transport machine 30 is in the capturable range and transmits the acquired captured image to the information processing apparatus 10.

The information processing apparatus 10 performs recognition processing to be described later on the captured image and controls the transport machine 30 and the manipulator 20 based on the result of the recognition processing. Details of the recognition processing will be described later.

Figure 2:
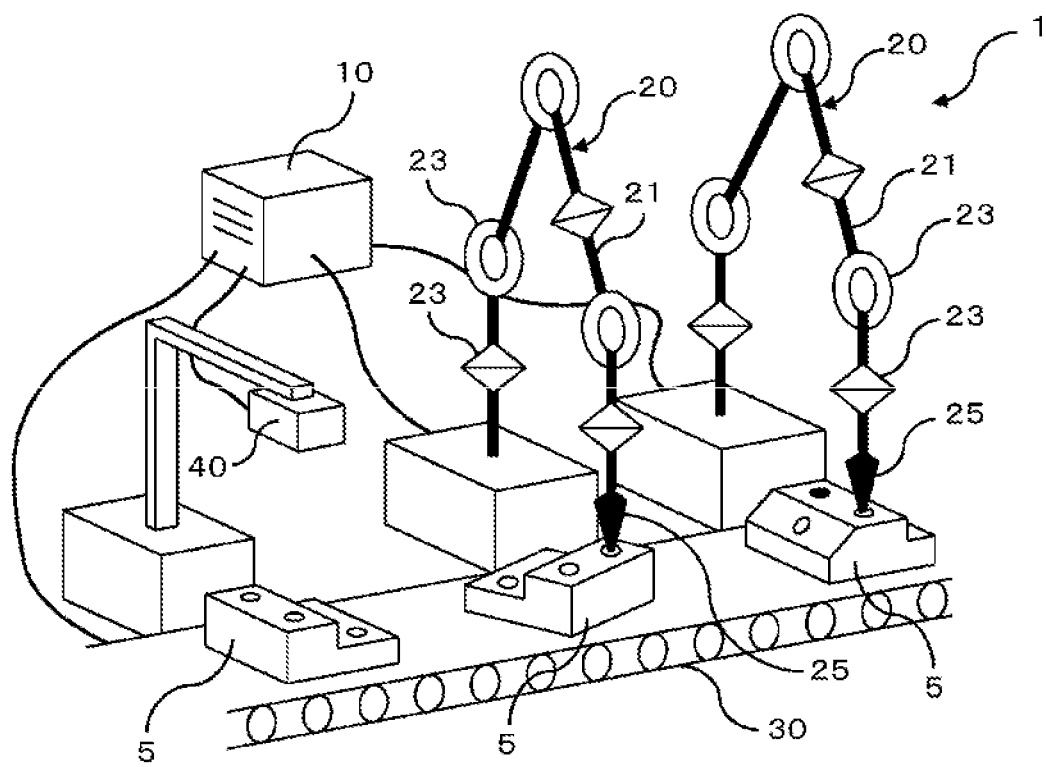
FIG. 2 is a diagram illustrating a schematic configuration of a second example of the robot work system 1.

FIG. 2 is a screw fastening work system illustrated as a second example of the robot work system 1. As illustrated in FIG. 2, the robot work system 1 includes the information processing apparatus 10, the manipulator 20, the transport machine 30, and the capturing device 40. Similarly as in the first example, the information processing apparatus 10 communicably connects to the manipulator 20, the transport machine 30, and the capturing device 40, transmits and receives data to and from these devices, and controls these devices.

The transport machine 30 of the second example is a belt conveyor and conveys the article 5 to the workable range. The transport machine 30 can passively perform control (control of the transportation speed and the like) according to a control signal sent from the information processing apparatus 10. Similarly as in the first example, the transport machine 30 of the second example may also be configured to be capable of active control.

In the robot work system 1 of the second example, a screw hole to be a work target is determined from among a plurality of screw holes (work target candidates) provided in the article 5 placed on the transport machine 30 and transported, and screw tightening work is performed on the determined work target. The robot work system 1 can perform the work described above in a state (moving state) in which the transport machine 30 transports the article 5.

A basic configuration of the manipulator 20 of the second example is the same as that of the first example, but a screwdriver tool 25 is provided at the tip of the manipulator 20 of the second example. The configuration of the capturing device 40 of the second example is the same as that of the first example. Also, the configuration of the information processing apparatus 10 of the second example is basically the same as that of the first example, and the information processing apparatus 10 performs recognition processing to be described later on the captured image and controls the manipulator 20 based on the result of the recognition processing.

As illustrated in FIG. 2, the robot work system 1 of the second example includes a plurality of (two in FIG. 2) manipulators individually controlled by the information processing apparatus 10. For example, the information processing apparatus 10 performs the recognition processing based on one captured image acquired by the capturing device 40, and the information processing apparatus 10 can control each manipulator 20 so that each of the manipulators 20 performs work on a different work target (screw hole), based on the result of the recognition processing.

The robot work system 1 may be, for example, a system that performs other work such as soldering and assembling for the transported articles 5. Unless otherwise specified, the robot work system 1 of the first example will be described below as an example.

Figure 3:
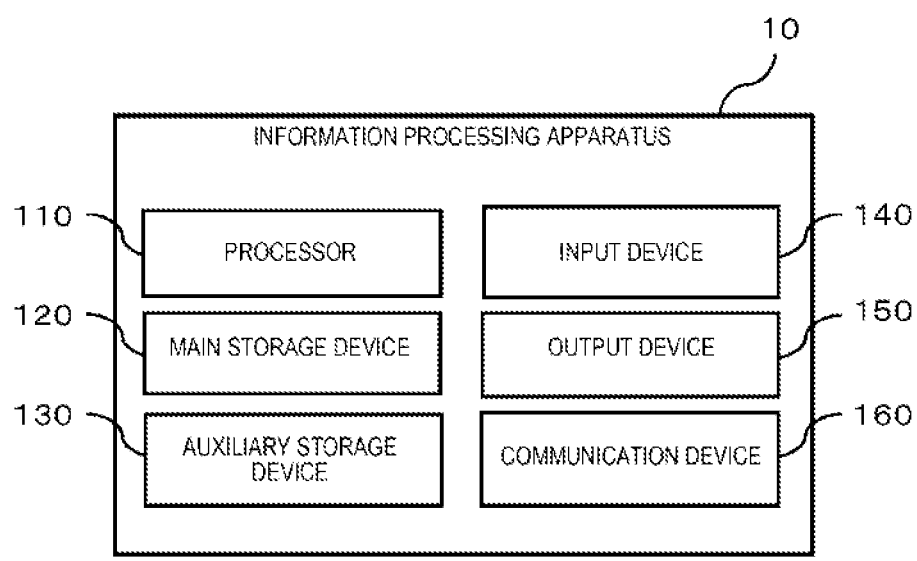
FIG. 3 is an example of a hardware configuration of an information processing apparatus.

FIG. 3 is an example of a hardware configuration of the information processing apparatus 10. As illustrated in FIG. 3, the information processing apparatus 10 includes a processor 110, a main storage device 120, an auxiliary storage device 130, an input device 140, an output device 150, and a communication device 160. These devices communicably connected to each other via communication means such as a bus (not illustrated). The information processing apparatus 10 may be independent hardware or may be one which utilizes, for example, hardware provided in another configuration of the robot work system 1 like a microcomputer mounted on the manipulator 20. Further, the information processing apparatus 10 may be realized by using a virtual information processing resource such as a cloud server provided by a cloud system, for example.

The processor 110 is configured using, for example, a central processing unit (CPU), a micro processing unit (MPU), a field-programmable gate array (FPGA), a graphics processing unit (GPU), an AI chip, or the like. Various functions of the information processing apparatus 10 are realized by the processor 110 reading and executing a program stored in the main storage device 120. The main storage device 120 is a device that stores programs and data, and is, for example, a read only memory 9 (ROM), a random access memory (RAM), a nonvolatile RAM (NVRAM), or the like. The auxiliary storage device 130 is, for example, a hard disk drive, a solid state drive (SSD), an optical storage device (compact disc (CD), digital versatile disc 9 (DVD), and the like), a storage system, an IC card, an SD card, a reading/writing device of a recording medium such as an optical recording medium, a storage area of a cloud server, and the like. The auxiliary storage device 130 can read programs and data through the reading device of the recording medium and the communication device 160. Programs and data stored in the auxiliary storage device 130 are read into the main storage device 120 at any time.

The input device 140 is an interface for receiving an input from the outside, and is, for example, a keyboard, a mouse, a touch panel, a card reader, a voice input device, and the like.

The output device 150 is an interface for outputting various kinds of information such as a processing progress and a processing result (for example, a captured image 451, a recognition result 452, a transport machine control parameter 453, a manipulator control plan 454, a learning data 461, a learning model 462, and the like), and is, for example, a display device (a liquid crystal monitor, a liquid crystal display (LCD), a graphic card, and the like) for visualizing the various information described above, a voice output device (speaker and the like), a printing device, and the like. For example, the information processing apparatus 10 may be configured to input and output information with another device through the communication device 160.

The communication device 160 is a device that realizes communication with the manipulator 20, the transport machine 30, and the capturing device 40. The communication device 160 is a wired or wireless communication interface that realizes communication with another device through communication means such as a local area network (LAN), a wide area network (WAN), the Internet, and the like, and is, for example, a network interface card (NIC), a wireless communication module, a universal serial bus (USB) module, a serial communication module, and the like.

Figure 4:
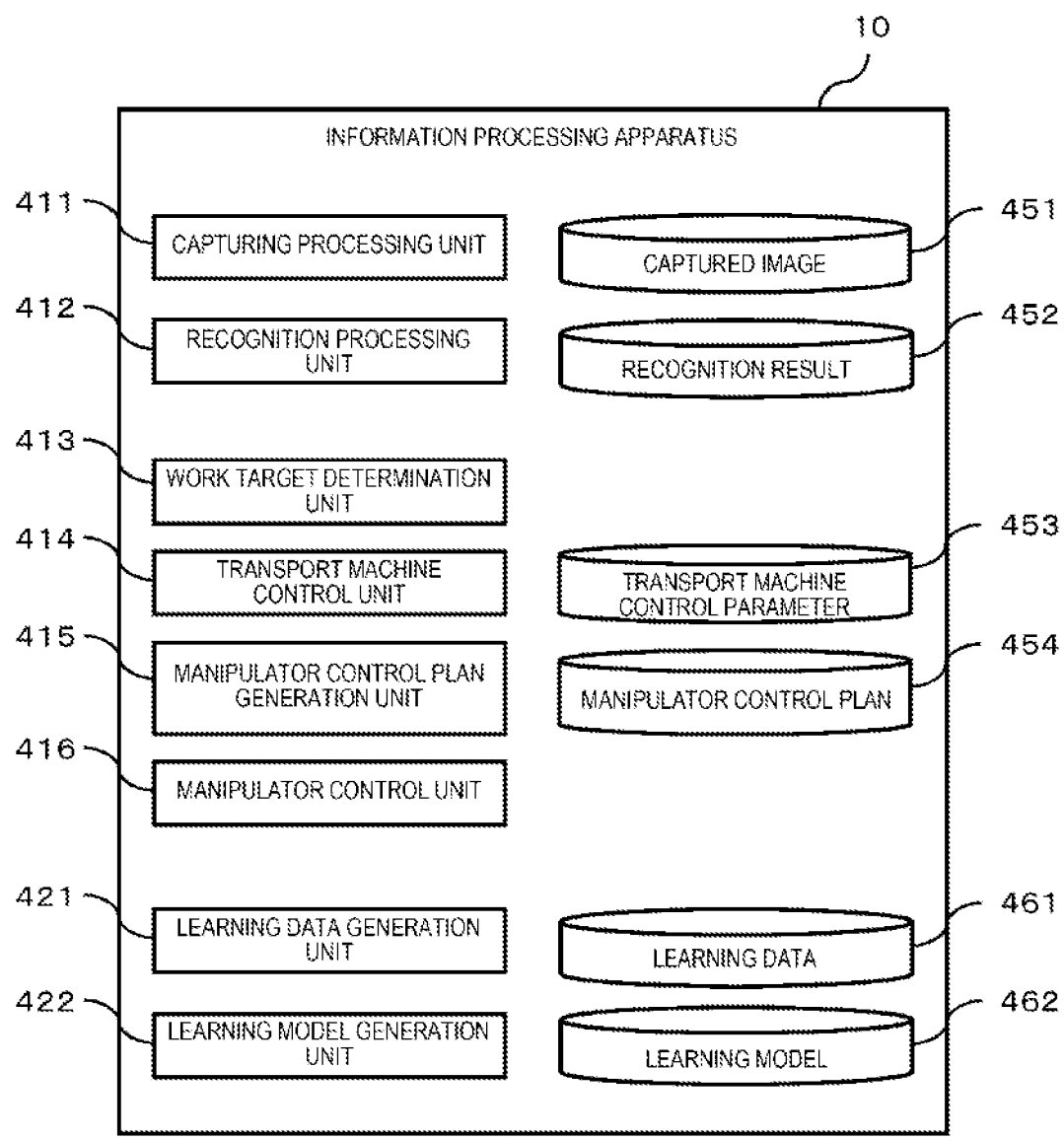
FIG. 4 is a diagram illustrating main functions and data provided in the information processing apparatus.

FIG. 4 illustrates main functions and data provided in the information processing apparatus 10. As illustrated in the FIG. 4, the information processing apparatus 10 is provided with various functions of an capturing processing unit 411, a recognition processing unit 412, a work target determination unit 413, a transport machine control unit 414, a manipulator control plan generation unit 415 (a robot control plan generation unit), a manipulator control unit 416 (robot control unit), a learning data generation unit 421, and a learning model generation unit 422. These functions are realized by the processor 110 of the information processing apparatus 10 reading and executing the program stored in the main storage device 120. The information processing apparatus 10 may include an operating system, a file system, a data base management system (DBMS), and the like.

As illustrated in the FIG. 4, the information processing apparatus 10 stores a captured image 451, a recognition result 452, a transport machine control parameter 453, a manipulator control plan 454, learning data 461, and a learning model 462. The information processing apparatus 10 manages these data as, for example, a file, a table of a database managed by the DBMS, or the like.

Among the functions described above, when the capturing target has entered a capturable range, the capturing processing unit 411 captures the capturing target in accordance with the capturing timing to be described later, and stores the captured image as the captured image 451.

The recognition processing unit 412 performs recognition processing to be described later on the captured image to generate and store the recognition result 452. The generated recognition result 452 is used for determining the work target, controlling the transport machine 30 and the manipulator 20, and the like. The recognition processing is realized by using the learning model 462 generated by the machine learning by the learning data generation unit 421. Based on the recognition result 452, the work target determination unit 413 determines a work target from the work target candidates.

The transport machine control unit 414 generates the transport machine control parameter 453 to be described later based on a transport machine optimum control parameter (to be described later) of the work target determined by the work target determination unit 413 and controls the transport machine 30 by transmitting the generated transport machine control parameter 453 to the transport machine 30.

The manipulator control plan generation unit 415 generates the manipulator control plan 454 including information defining operation and control timing of the manipulator 20 based on the position of the work target (position of the work target candidate in the captured image) determined by the work target determination unit 413 and the transport machine control parameter to be described later. When the manipulator control unit 416 detects that the work target has entered the control preparation start distance described later, the manipulator control unit 416 controls the manipulator 20 according to the manipulator control plan 454 and performs work on the determined work target.

The learning data generation unit 421 generates the learning data 461 used for machine learning of the learning model 462. The learning model generation unit 422 generates the learning model 462 by learning a considerable number of learning data 461, for example. Details of processing performed by each of the learning data generation unit 421 and the learning model generation unit 422 will be described later.

The captured image 451 is an image captured (acquired) by the capturing device 40, and is, for example, an image in a pixel format.

The recognition result 452 includes, for example, a combination of a position of a work target candidate in the captured image 451 (in the two-dimensional or three-dimensional coordinate system set in the captured image 451) and a transport machine optimum control parameter to be described later of each of the work object candidates. The recognition result 452 includes, for example, the position of the work target candidate in the captured image 451, and a combination of the transport machine optimum control parameter to be described later of each of the work target candidates and performance to be described later. The recognition result 452 includes, for example, the position of the work target candidate and a combination of the transport machine optimum control parameter to be described later of each of the work target candidates and an optimum control parameter of the manipulator 20 to be described later. Further, the recognition result 452 includes, for example, the position of the work target candidate and a combination of the transport machine optimum control parameter to be described later of each of the work target candidates, the performance to be described later, and the optimum control parameter of the manipulator 20 to be described later.

The learning data 461 includes a large number of data (teaching data, training data) used for machine learning of the learning model 462. The learning data 461 includes, for example, a combination of the captured image, the position of the work target candidate, and the transport machine optimum control parameter to be described later of each of the work target candidates. The learning data 461 includes, for example, the captured image and a combination of the position of the work target candidate, the transport machine optimum control parameter to be described later of each of work target candidates, and the performance to be described later. The learning data 461 includes, for example, the captured image, the position of the work target candidate and a combination of the transport machine optimum control parameter to be described later of each of the work target candidates and the optimum control parameter of the manipulator 20 to be described later. Further, the learning data 461 includes, for example, the captured image and a combination of the position of the work target candidate, the transport machine optimum control parameter to be described later of each of the work target candidates, the performance to be described later, and the optimum control parameter of the manipulator 20 to be described later.

The learning model 462 includes a parameter group constituting an intermediate layer 612 to be described later of a convolutional neural network (CNN) for realizing recognition processing to be described later. The parameters described above are, for example, weight (including bias) given to each perceptron of the convolution neural network.

Figure 5:
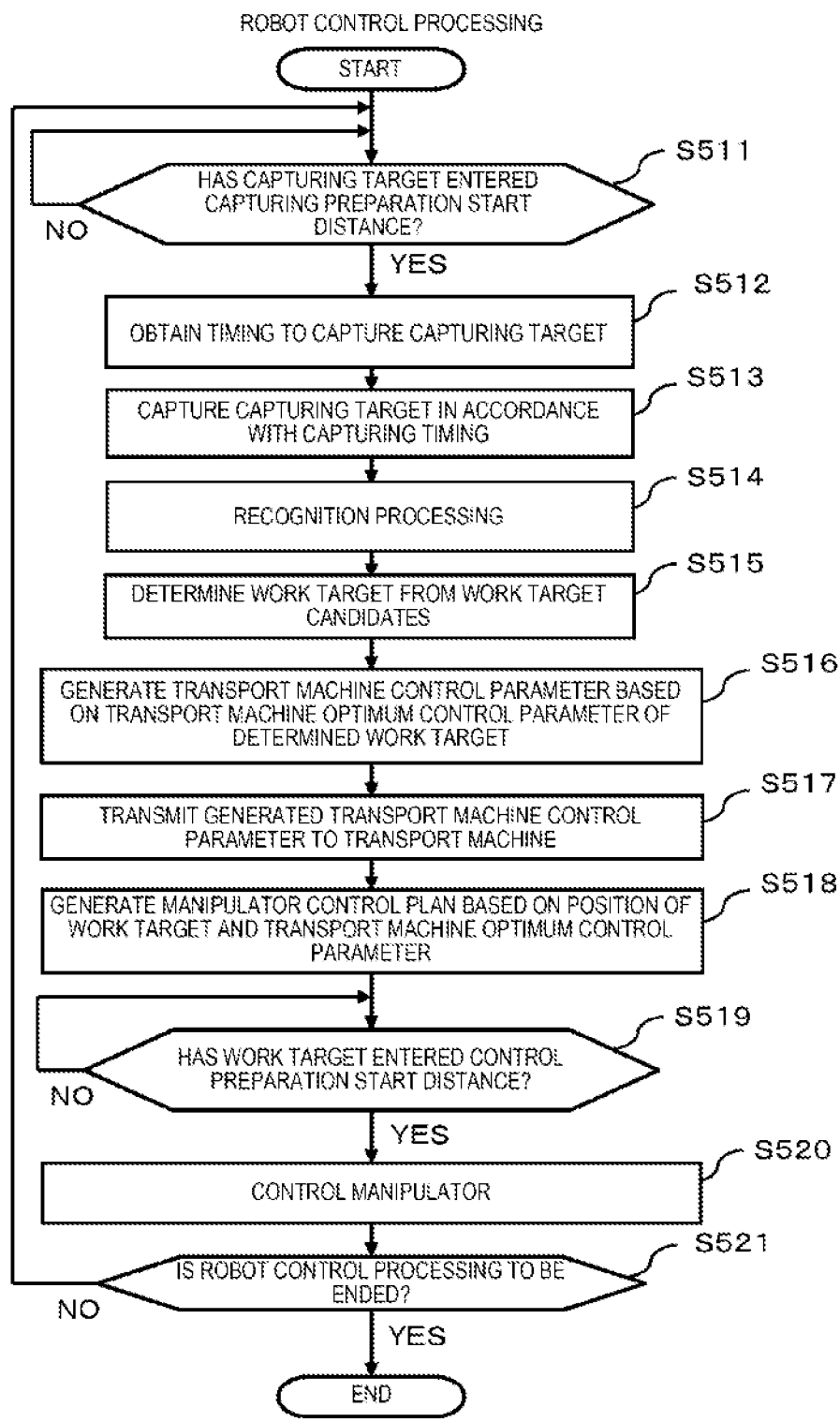
FIG. 5 is a flowchart illustrating robot control processing.

FIG. 5 is a flowchart illustrating processing (hereinafter, referred to as "robot control processing") performed by the information processing apparatus 10 when performing work on the work target. The robot control processing will be described below with reference to FIG. 5. The letter "S" attached before the sign means a processing step.

As illustrated in the FIG. 5, the capturing processing unit 411 of the information processing apparatus 10 monitors in real time whether or not the capturing target has entered a predetermined distance (hereinafter referred to as imaging preparation start distance) from the capturing device 40 (NO in S511). When the capturing processing unit 411 detects that the capturing target has entered the capturing preparation start distance from the capturing device 40 (YES in S511), the processing proceeds to A512.

The capturing processing unit 411 detects that the capturing target has entered the capturing preparation start distance from the capturing device 40, based on information indicating the current position of the transport machine 30 or the capturing target, information acquired from an object detection sensor, a distance measurement sensor or the like provided on the periphery of the capturing device 40, an image obtained by capturing the transport machine 30 or the capturing target.

In S512, the capturing processing unit 411 obtains capturing timing of the capturing target. That is, since the capturing target is moving together with the transport machine 30, the capturing processing unit 411 obtains the time from when the capturing target has entered the capturing preparation start distance from the capturing device 40 until reaching the capturing position of the capturing device 40, and obtains the capturing timing based on the obtained time.

The time from when the capturing target has entered the capturing preparation start distance from the capturing device 40 until reaching the capturing position of the capturing device 40 is obtained based on information such as the current position, the moving speed, the moving direction, the moving route, and the like of the transport machine 30, for example. In a case where the robot work system. 1 is the first example, the capturing target is the article 5 accommodated in the box 2 and the box 2, and in the case where the robot work system 1 is the second example, the capturing target is the article 5 which is placed on the transport machine 30.

Subsequently, when the capturing target has entered the capturable range, the capturing processing unit 411 captures the capturing target in accordance with the capturing timing obtained in S512 and stores the captured image as the captured image 451 (S513).

Subsequently, the recognition processing unit 412 inputs the captured image 451 acquired in S513 to the learning model 462 (intermediate layer 612) to thereby execute processing (hereinafter, referred to as "recognition processing") for obtaining a combination of the position (in the coordinate system of the captured image 451) of the work target candidate in the captured image 451 and the optimum control parameter of the transport machine 30 (hereinafter, referred to as "transport machine optimum control parameter") for each work target candidate and perform processing (hereinafter referred to as recognition processing S514) of storing the obtained result as a recognition result 452. As described above, by obtaining the combination of the position of the work target candidate in the captured image 451 and the transport machine optimum control parameter for each work target candidate using the learning model 462 in the recognition processing S514, it is possible to accurately obtain the control parameter of the transport machine 30 for maximizing work efficiency (hereinafter, referred to as performance).

The optimum control parameters for the transport machine described above are, for example, the transportation speed of the articles 5 of the transport machine 30, the moving route of the transport machine 30, and the like. The performance described above is an index for evaluating efficiency of the work performed by the robot work system 1 (efficiency obtained by coordinating the transport machine 30 and the manipulator 20), and is, for example, the transportation speed of the transport machine 30, the success rate (hereinafter, referred to as "work success rate") of work, a value obtained by multiplying the transportation speed described above by the work success rate described above, and the like. The work success rate described above can be obtained by, for example, an experiment using an actual system or simulation or the like by an information processing apparatus. The work success rate is changed by increasing or decreasing the transportation speed of the article 5 of the transport machine 30, and changes as the positional relationship between the article 5 and the manipulator 20 is changed by bringing the moving route of the transport machine 30 closer to or away from the manipulator 20.

The recognition processing S514 is may be processing for obtaining a combination of the position of the work target candidate in the captured image 451 and a combination of the transport machine optimum control parameter to be described later of each of the work target candidates and the performance to be described later. In addition, the recognition processing S514 is may be processing of obtaining a combination of the position of the work target candidate, the optimum transport parameter control parameter of each of the work target candidates, and the optimum control parameter (hereinafter, referred to as a manipulator optimum control parameter) of the manipulator 20. Here, the manipulator optimum control parameter is, for example, a position in the moving direction of the transport machine 30 at the moment when the manipulator 20 grips the work target candidate. The performance changes by changing this manipulator optimum parameter. Furthermore, the recognition processing S514 may be processing of obtaining, for example, the combination of the position of the work target candidate in the captured image 451, the transport machine optimum control parameter of each work target candidate, the performance to be described later, and the manipulator optimum control parameter (robot optimum control parameter). By adopting such processing as the recognition processing S514, it is possible to obtain an appropriate one as the control parameter of the transport machine 30 and the control parameter of the manipulator 20 for maximizing the performance of the whole work.

Subsequently, based on the recognition result 452, the work target determination unit 413 determines a work target from the work target candidates (S515). For example, the work target determination unit 413 determines a work target candidate whose work performance is the maximum as a work target. As such, since the work target determination unit 413 determines the work target candidate having the maximum performance (efficiency obtained by the cooperation between the transport machine 30 and the manipulator 20) as the work target, it is possible to optimize the work efficiency from the overall viewpoint of the robot work system 1.

Subsequently, the transport machine control unit 414 generates a control parameter (hereinafter, referred to as "transport machine control parameter") of the transport machine 30 based on the transport machine optimum control parameter of the determined work target (S516), and transmits the generated control parameter to the transport machine 30 (S517).

Subsequently, the manipulator control plan generation unit 415 generates a control plan (manipulator control plan 454) of the manipulator 20 including the operation and timing (hereinafter referred to as "control timing") of the control of the manipulator 20 based on the determined position (position of the work target candidate in the captured image) of the work target and the transport machine control parameter (Step S518). In a case where the manipulator optimum control parameter is obtained in the recognition processing S514, the manipulator control plan generation unit 415 may generate the manipulator control plan 454 based on the manipulator optimum control parameter.

Subsequently, the manipulator control unit 416 monitors whether or not the work target has entered a predetermined distance (hereinafter referred to as "control preparation start distance") from the manipulator 20 (NO in S519). When the manipulator control unit 416 detects that the work target has entered the control preparation start distance (S519 YES in), the processing proceeds to S520. For example, the manipulator control unit 416 determines that the work target has entered the control preparation start distance from the manipulator 20, based on the current position of the transport machine 30 or the work target, information acquired from an object detection sensor, a distance measurement sensor or the like provided on the periphery of the manipulator 20, an image obtained by capturing the transport machine 30 or the work target.

In S520, the manipulator control unit 416 controls the manipulator 20 according to the manipulator control plan generated in S518, and performs work on the work target. For example, in the case of the first example, the manipulator control unit 416 controls the manipulator 20 to pick up the article 5 which is a work target, and in the case of the second example, for example, the manipulator control unit 416 controls the manipulator 20 to perform crew-tightening for the screw hole which is the work target.

In S521, the information processing apparatus 10 determines whether to end the robot control processing. When it is determined that the information processing apparatus 10 does not end the robot control processing (NO in S521), the processing returns to S511. When it is determined that the information processing apparatus 10 ends the robot control processing (YES in S521), the processing is ended. For example, the information processing apparatus 10 determines to end the robot control processing when receiving a work stopping operation from a user.

Subsequently, a realization method of the recognition processing S514 in FIG. 5 will be described.

First Realization Method of Recognition Processing

Figure 6:
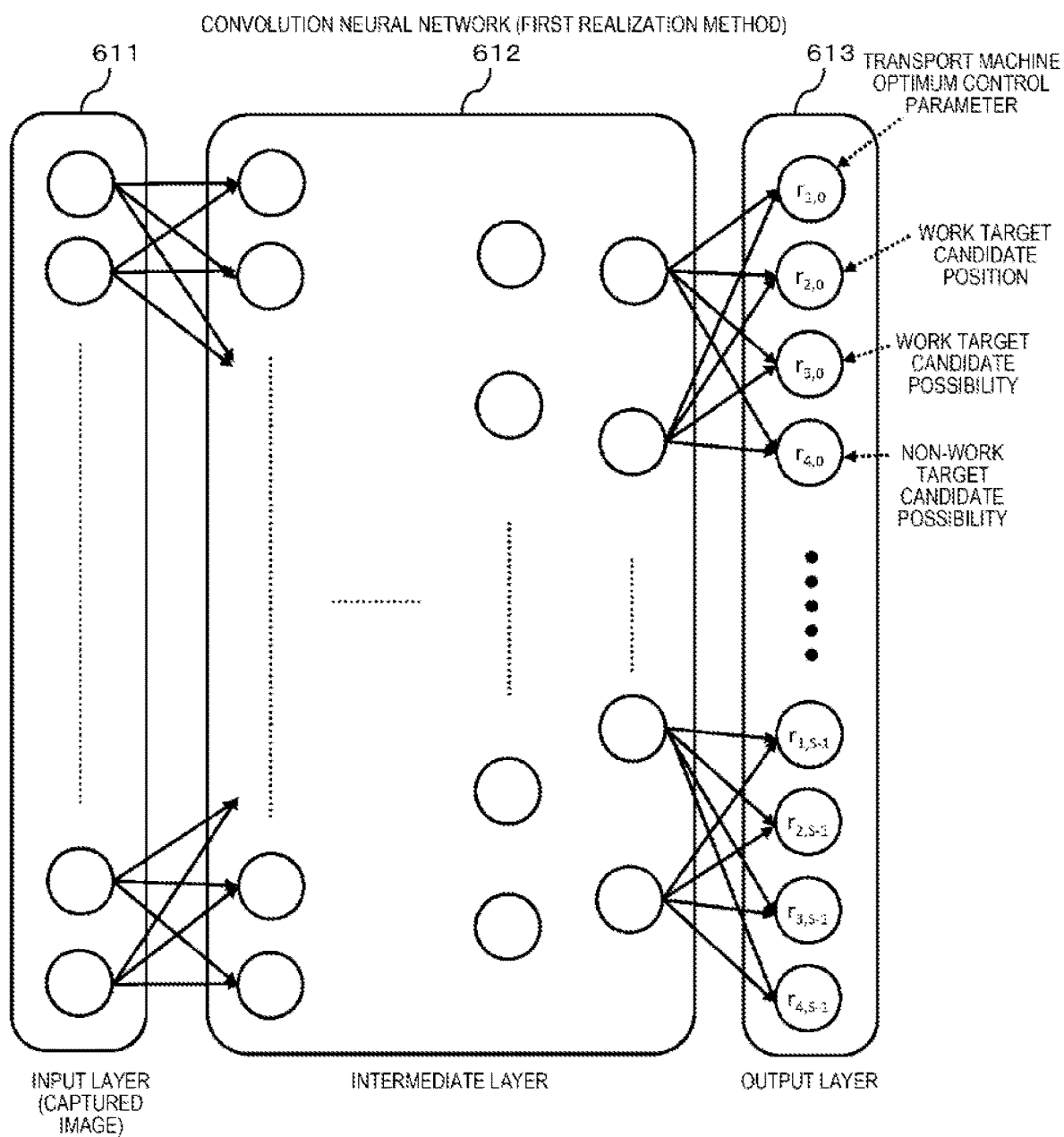
FIG. 6 is a view for explaining a convolution neural network used for a first realization method of recognition processing.

FIG. 6 is a diagram for explaining a structure of a convolution neural network used for the first realization implementation method of the recognition processing S514. A captured image is input to an input layer 611 of the convolution neural network. An intermediate layer 612 includes a plurality of (for example, approximately 20 layers) of convolution layers. The intermediate layer 612 obtains each predicted value of a transport machine optimum control parameter $r_{1,0}$, a work target candidate position $r_{2,0}$, a work target candidate possibility $r_{3,0}$, a non-work target candidate possibility $r_{4,0}$, and the like in the output layer 613. Here, the first subscript attached to each of the predicted values described above represents a type of an output value and the second subscript is an identifier of each grid generated by dividing the captured image given to the input layer 611 into a plurality of square unit regions (region each of which having such a size that predicted positions of a plurality of work target candidates do not fall within the same region, hereinafter referred to as a grid).

Figure 7:
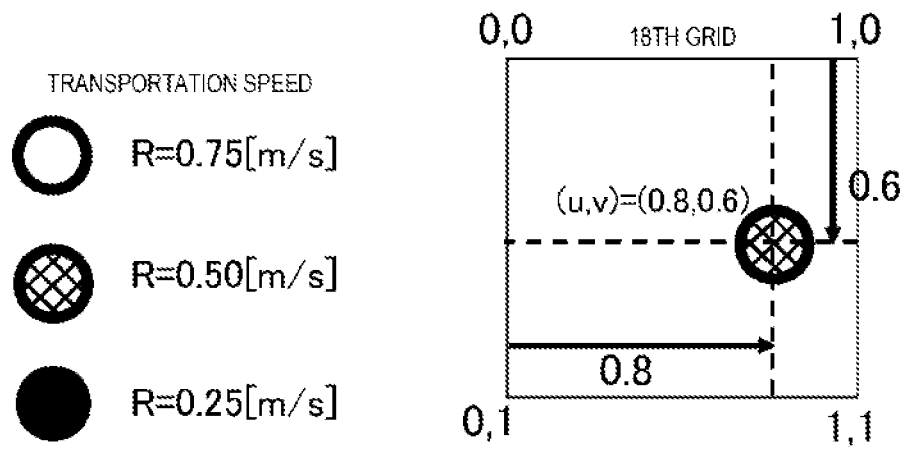
FIG. 7 is a view illustrating a specific example of an output layer in a case where a captured image is divided into grids.

FIG. 7 illustrates a specific example of an output layer 613 in the case where the captured image is divided into S (in this example, S=25) grids. In the FIG. 7, (u, v) is a coordinate indicating the position in the grid. The center of the circle illustrated in the grid indicates the gripping point position of the work target candidate. The color of the circle represents the transportation speed of the transport machine 30.

In generating the learning model 462 (including the parameters of each layer of the intermediate layer 612), for example, the learning model generation unit 422 generates the learning model 462 by specifying the learning data 461 whose difference from the predicted value obtained by the intermediate layer 612 has entered the allowable range, giving the predicted value of the specified learning data 461 to a loss function (hereinafter referred to as total difference value L), and updating the parameters of each layer of the intermediate layer 612 in the direction of decreasing the value of the total difference value L. Update of the parameters described above may be performed by, for example, a stochastic gradient descent method or an error back propagation method. An example of the method of calculating the total difference value L is described below.

$$L = \frac{1}{B}\sum_{i=0}^{B-1} \Lambda_i \quad (1)$$

L . . . total difference value
B . . . number of captured images of learning data
i. identifier of captured image 0 to B−1
Λi difference value by image of captured image i $$\Lambda_i = \sum_{j=0}^{S-1} A_{ij}^{loc}(R_{ij} - \widetilde{R_{ij}}) + \lambda_{noloc}\sum_{j=0}^{S-1}(1 - A_{ij}^{loc})(R_{ij} - \widetilde{R_{ij}}) + \quad (2)$$

$$\lambda_{coord}\sum_{j=0}^{S-1}\langle A_{ij}^{loc}\{(u_{ij} - \widetilde{u_{ij}})^2 + (v_{ij} - \widetilde{v_{ij}})^2\}\rangle - \sum_{j=0}^{S-1}\sum_{k=0}^{K-1} t_{ijk}\log p_{ijk}$$

S . . . number of grids
j . . . identifier of grid 0 to S−1
K=2 . . . number of grid classes
k . . . number of classes
0 . . . work target candidate
1 . . . non-work target candidate
$R_{ij}$ . . . transport machine optimum control parameter $r_1$ (predicted result)
$\widetilde{R_{ij}}$ . . . transport machine optimum control parameter $r_1$ (learning data)
$u_{ij}, v_{ij}$ . . . work target candidate position $r_2$ (predicted result)
$\widetilde{u_{ij}}, \widetilde{v_{ij}}$ . . . work target candidate position $r_2$ (learning data)
$p_{ij0}$ . . . work target candidate possibility (predicted result)
$p_{ij1}$ . . . non-work target candidate possibility (predicted result)
$t_{ij0}$ . . . work target candidate possibility (learning data)
$t_{ij1}$ . . . non-work target candidate possibility (learning data)
$A_{ij}^{loc}=t_{ij0}$ . . . 0: non-work target candidate, 1: work target candidate (learning data)
$\lambda_{noloc}$ . . . degree of importance of transport machine control parameter prediction in non-work target candidate
$\lambda_{coord}$ . . . degree of importance of work target candidate position Each degree of importance is a relative value when the degree of importance of the transport machine control parameter in the work target candidate is set to 1.

As described above, according to the first realization method, it is possible to obtain the control parameters (carrier optimum control parameters) of the transport machine 30 that maximize the performance of work, and it is possible to obtain the control parameters of the transport machine 30 that maximize the performance of the work when the work is performed in a state where the transport machine 30 is moving.

In the matters as described above, although a case where the intermediate layer 612 obtains the transport machine optimum control parameter $r_{1,0}$, the work target candidate position $r_{2,0}$, the work target candidate possibility $r_{3,0}$, and the non-work target candidate possibility $r_{4,0}$ as the predicted values is exemplified, the intermediate layer 612 may be configured to further obtain the performance $r_{5,0}$ and the manipulator optimum control parameter $r_{6,0}$ as the output layer 613.

Figure 8:
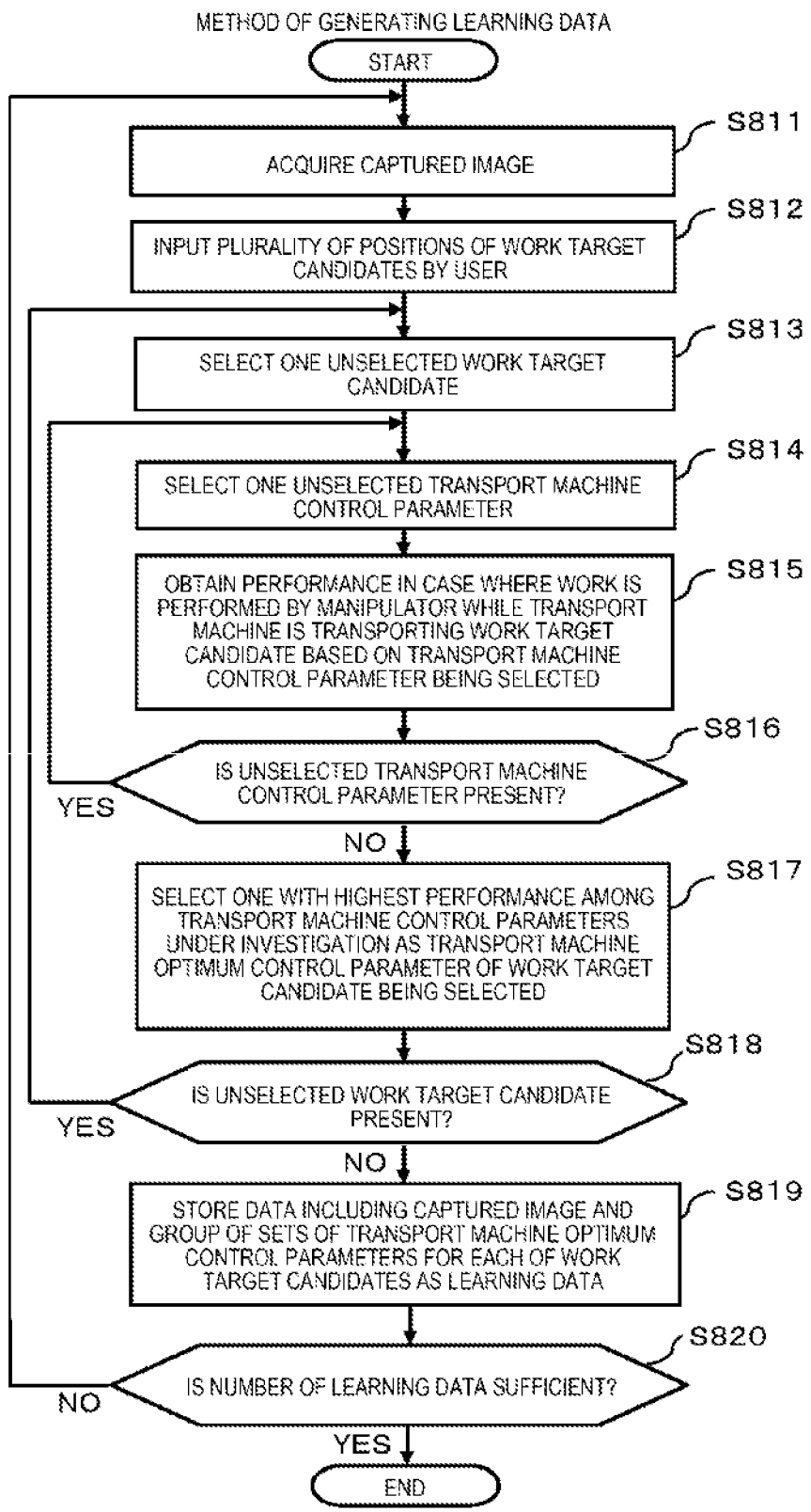
FIG. 8 is a flowchart illustrating a method of generating learning data in the first realization method.
Figure 9:
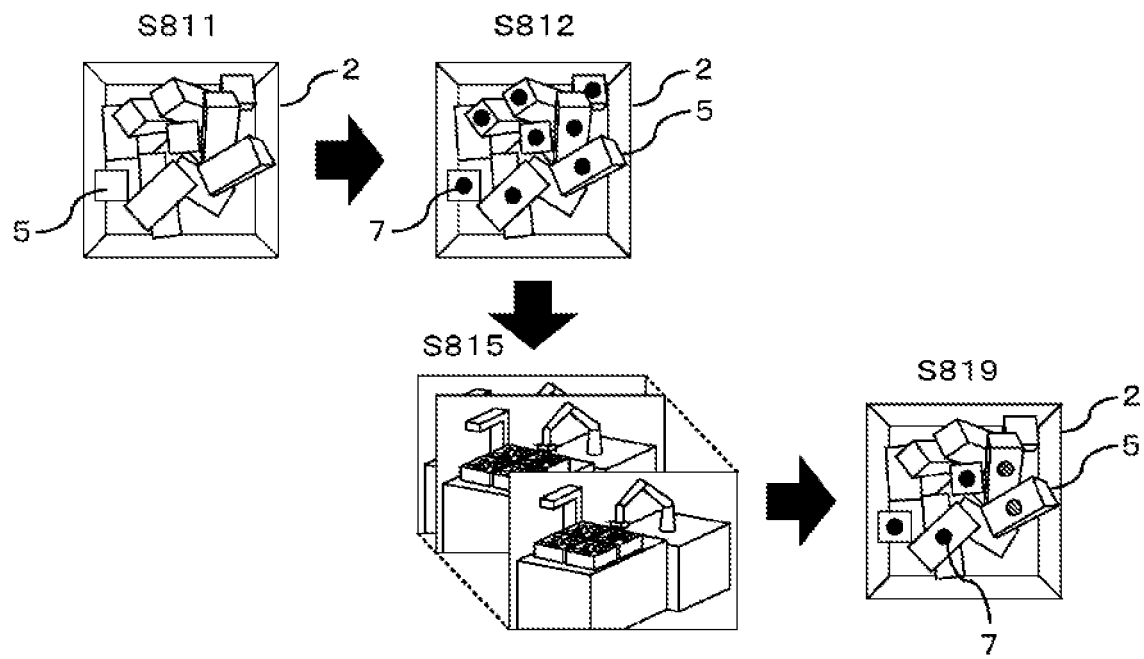
FIG. 9 is a view for explaining the method of generating learning data in the first realization method.

FIG. 8 is a flowchart for explaining the method of generating the learning data 461 in the first realization method, and FIG. 9 is a view for explaining the method of generating the learning data 461 in the first realization method. Generation of the learning data 461 can be performed using, for example, the configuration of the robot work system 1 illustrated in FIG. 1 or 2 illustrated as the first example or the second example. Hereinafter, a method of generating the learning data 461 in the first realization method will be described together with these FIGS. 1 and 2.

First, the user acquires a captured image by capturing the box 2 accommodating the plurality of articles 5 from the upper opening side of the box 2 by the capturing device 40 (S811).

Subsequently, while displaying the captured image on the output device 150, the learning data generation unit 421 receives an input of setting of the work target candidate (reference numeral 7 in FIG. 9) from the user through the input device 140 (setting of the gripping point position of the article 5 in the first example, setting of the screw hole position in the second example) (S812).

In the subsequent S813, the learning data generation unit 421 selects one unselected work target candidate in the processing (S813).

In the subsequent S814, the learning data generation unit 421 selects one unselected transport machine control parameter in the processing (S814). It is assumed that the information processing apparatus 10 stores a plurality of selectable transport machine control parameters (for example, 0.1 m/s, 0.2 m/s, 1.0 m/s, and the like for the moving speed of the transport machine 30, and the distance to the manipulator 20 such as 10 cm, 15 cm, . . . , 30 cm, and the like for the moving route of the transport machine 30) in advance. Further, in the case where a configuration in which the manipulator optimum control parameter is obtained as the output layer 613 in FIG. 6 is adopted, it is assumed that the information processing apparatus 10 stores a plurality of selectable manipulator control parameters (for example, positions of 0 cm, ±5 cm, ±10 cm, . . . , ±25 cm, and the like in the moving direction of the transport machine 30 as seen from the manipulator 20 at the moment when the manipulator 20 grips the work target) in advance.

Subsequently, the learning data generation unit 421 obtains the performance when the work is performed by the manipulator 20 while the transport machine 30 is transporting the work target candidate (while the transport machine 30 is moving) based on the transport machine control parameter being selected (S815). The performance when work is performed with the manipulator 20 is, for example, the work success rate, and can be obtained as a success rate of the operation plan by performing the operation plan of the manipulator 20 for performing the work a plurality of times by the method (dynamic RRT=dynamic Rapidly-exploring Random Tree) disclosed in H. Deng, Z. Xia and J. Xiong, "Robotic Manipulation Planning Using Dynamic RRT," Proc. of The 2016 IEEE Int. Conf. on Real-time Computing and Robotics, pp. 500-504, 2016.

Subsequently, the learning data generation unit 421 determines whether or not an unselected transport machine control parameter is present in S814 (S816). When it is determined that an unselected transport machine control parameter is present (YES in S816), the processing returns to S814 to select another unselected transport machine control parameter. When it is determined that an unselected transport machine control parameter is not present (NO in S816), the processing proceeds to S817.

In step S817, the learning data generation unit 421 selects one transport machine control parameter having the highest performance among the transport machine control parameters selected in the processing of S814 to S816 as the transport machine optimum control parameter of the work target candidate being selected in step S813.

Subsequently, the learning data generation unit 421 determines whether or not an unselected work target candidate is present in S813 (S818). When it is determined that the unselected work target candidate is present (YES in S818), the processing returns to S813 to select another unselected work target candidate and performs the same processing as the processing described above. When it is determined that an unselected work target candidate is not present (NO in S818), the processing proceeds to S819.

In step S819, the learning data generation unit 421 stores data including the captured image acquired in step S811 and a combination of the position of the work target candidate and the transport machine optimum control parameters for each work target candidate, as the learning data 461.

In the subsequent S820, it is determined whether or not the user was able to acquire a sufficient number of learning data (S820). When the user determines that a sufficient number of learning data is not acquired (NO in S820), the processing returns to S811. When the user determines that a sufficient number of learning data can be obtained (YES in S820), generation of the learning data is ended.

As described above, in a case where the intermediate layer 612 is configured to further obtain the performance $r_{5,0}$ and the manipulator optimum control parameter $r_{6,0}$ as the output layer 613, for example, a loop similar to the loop of S814 to S819 is also performed for the performance and manipulator optimum control parameter. In that case, in step S819, the learning data generation unit 421 stores data including the captured image and a combination of the position of the work target candidate, the transport machine optimum control parameter of each of the work target candidates, and performance (or manipulator optimum control parameter), as the learning data 461.

In the meanwhile, in FIG. 8, although the user performs acquisition of the captured image (S811) and setting of the position of the work target candidate (S812), the information processing apparatus 10 may be configured to automatically perform these work by simulation.

Figure 10:
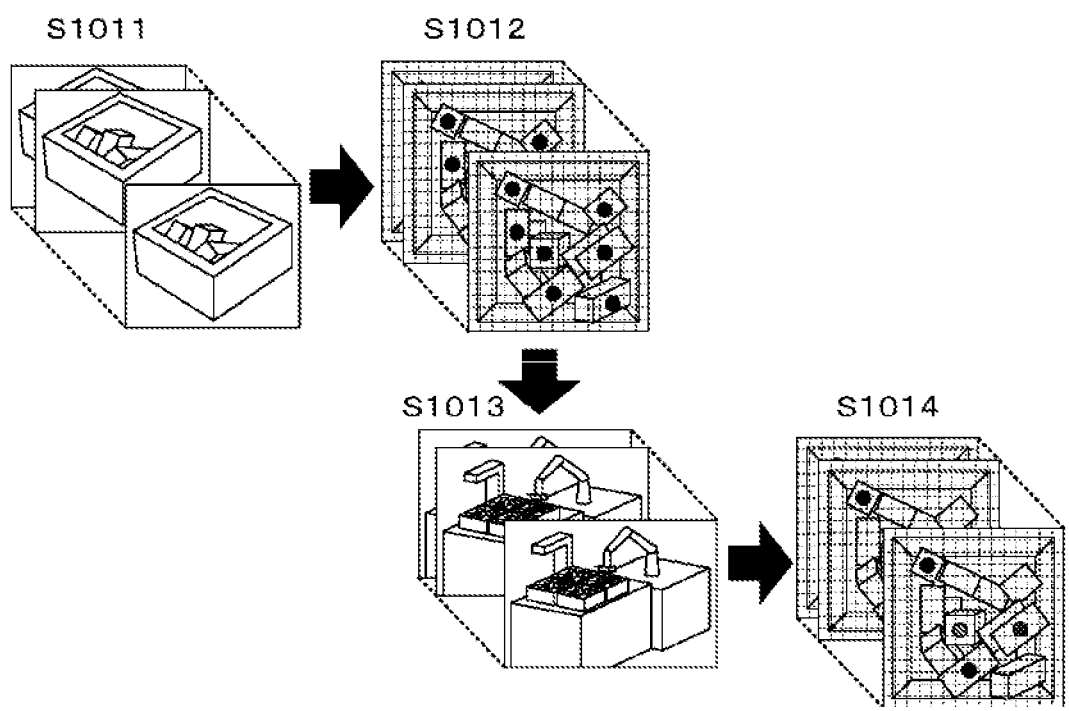
FIG. 10 is a view for explaining a case where the information processing apparatus automatically generates learning data by simulation.

For example, as illustrated in FIG. 10, the information processing apparatus 10 generates a captured image in which a plurality of articles 5 are in a state of being accommodated in the box 2 using an object model including a shape, a texture, and dimensions of an article (S1011), specifies a surface of the article 5, for example, and sets the center position of the surface as a work target candidate (S1012). Then, simulating a case where the work by the manipulator 20 is performed while the transport machine 30 transports the work target candidate (S1013) and obtains the performance (S1014). By doing as described above, it is possible to automate many of the parts manually performed in FIG. 8.

Figure 11:
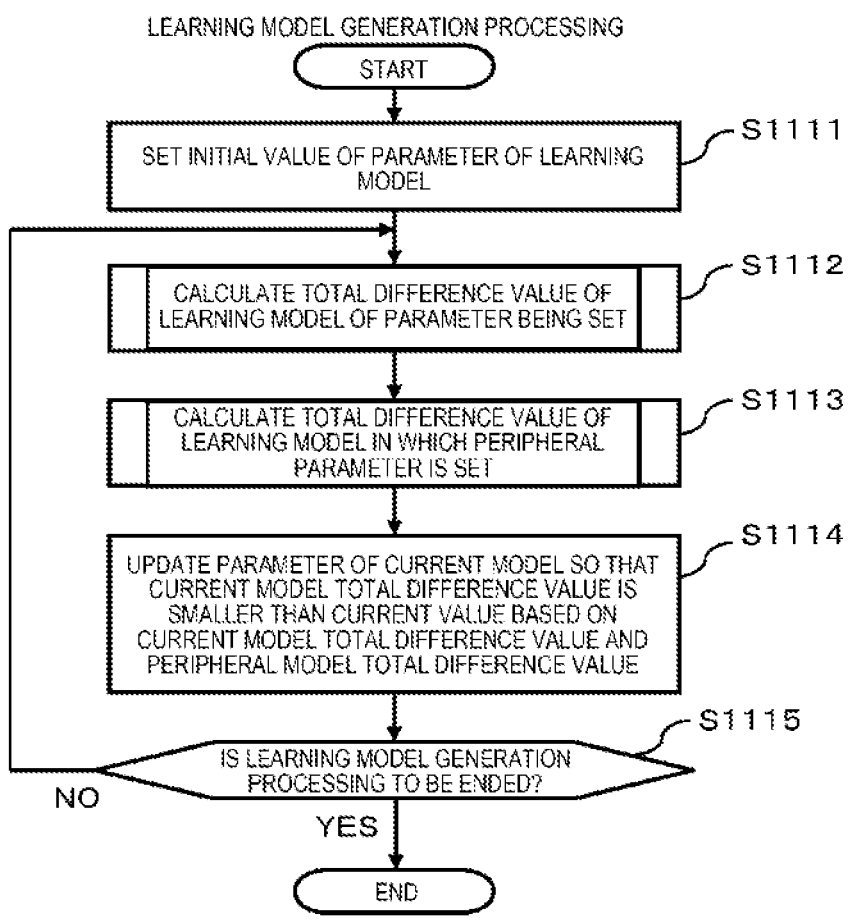
FIG. 11 is a flowchart for explaining learning model generation processing in the first realization method.
Figure 12:
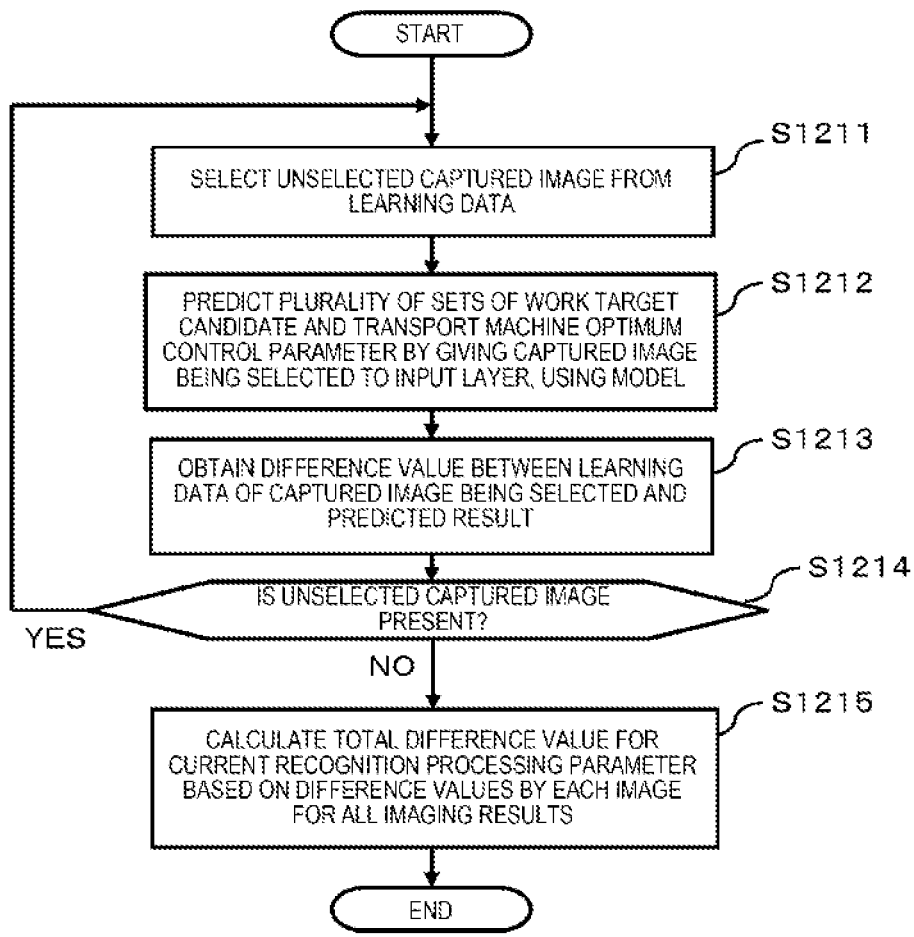
FIG. 12 is a flowchart for explaining total difference value calculation processing in the first realization method.

FIGS. 11 and 12 are flowcharts for explaining generation processing (hereinafter, referred to as learning model generation processing) of the learning model 462 performed using the learning data 461 in the first realization method. Hereinafter, the learning model generation processing will be described together with these FIGS. 11 and 12.

As illustrated in FIG. 11, the learning model generation unit 422 first sets initial values of parameters of the learning model (intermediate layer 612) (S1111).

Subsequently, the learning model generating unit 422 obtains a total difference value (hereinafter, referred to as the current model total difference value) to be described later on a learning model (hereinafter, referred to as the current model) of the parameter currently set (S1112).

Subsequently, the learning model generating unit 422 generates a total difference value (hereinafter, referred to as a peripheral model total difference value) for a learning model (hereinafter, referred to as a peripheral model) in which a parameter on the periphery of the currently set parameter is set (S1113).

Subsequently, the learning model generation unit 422 updates the parameter of the current model so that the current total model difference value is smaller than the current value based on the current model total difference value obtained in S1112 and the peripheral model total difference value (S1114).

Subsequently, the learning model generation unit 422 determines whether or not to end the learning model generation processing. When it is determined that the learning model generation unit 422 does not end the learning model generation processing (NO in S1115), the processing returns to S1112 and the processing from S1112 is performed on the current model of the updated parameter. When it is determined that the learning model generation unit 422 ends the learning model generation processing (YES in S1115), the learning model generation unit 422 stores the finally generated learning model as the learning model 462, and the learning model generation processing is ended.

For example, in a case where the current total model differential value does not converge even if the parameter is updated in S1114 (when a decrease amount of the total difference value after execution of one loop of S1112 to S1115 becomes equal to or less than the threshold value) and a case where the number of executions of the loop of S1112 to S1115 reaches the preset number of times, the learning model generation unit 422 determines to end the learning model generation processing.

FIG. 12 is a flowchart illustrating the processing of S1112 or S1113 in the learning model generation processing in the first realization method of FIG. 11 (processing of obtaining a current total model difference value or a peripheral model total difference value, hereinafter, referred to as total difference value calculation processing).

First, the learning model generation unit 422 selects one unselected image among the captured images included in the learning data 461 (S1211).

The learning model generation unit 422 gives the captured image selected in S1211 to the input layer 611 by using the model (current model or peripheral model) of the parameter being set (the parameter of the current model in a case where the caller of the total difference value calculation processing is S1112 and the parameters of the peripheral model in a case where the caller of the total difference value calculation processing is S1113) and predicts a plurality of sets of the work target candidate and the transport machine optimum control parameter (S1212).

Subsequently, the learning model generation unit 422 obtains a difference value between the predicted result and the learning data 461 of the captured image being selected for each set of the predicted work target candidate and the transport machine optimum control parameter (S1213).

Subsequently, the learning model generation unit 422 determines whether or not an unselected captured image is present in S1211 (S1214). When it is determined that the unselected captured image is present (YES in S1214), the learning model generation unit 422 selects the captured image of the other learning data and repeats processing from S1211. When it is determined that an unselected captured image is not present (NO in S1214), the learning model generation unit 422 calculates a total difference value for the current recognition processing parameter based on the difference values by each image for all imaging results (S1215). The learning model generation unit 422 then ends the total difference value calculation processing, and the processing proceeds to processing following the processing of S1112 or S1113 of the learning model generating processing of FIG. 12.

In a case where the intermediate layer 612 is configured to further obtain the performance $r_{5,0}$, and the manipulator optimum control parameter $r_{6,0}$ as elements of the output layer 613, for example, processing similarly to that of S1212 and S1213 performed for the optimum transport parameter control parameter is performed for each of the performance and the manipulator optimum control parameter as well.

Second Embodiment of Recognition Processing

Next, a second implementation method of recognition processing S514 in FIG. 5 will be described. In the second realization method, the learning model 462 is generated by fixing transport machine control parameters (for example, the transportation speed of the transport machine 30, the moving route of the transport machine 30, and the like). Then, the learning model 462 is prepared for each discrete value of the transport machine control parameters, the captured image is input for each learning model 462, and the work target candidate position and the performance are output as one of the recognition results. Among the output results, the transport machine control parameter of the learning model 462, from which the work target candidate having the maximum performance is obtained, becomes the transport machine optimum control parameter. As such, in a case where the learning model 462 is generated with the transport machine control parameter fixed, since complexity of the learning model 462 decreases, improvement in learning accuracy can be expected, and each fixed learning model 462 can be generated with light load. In the following description, description of parts common to the first realization method will be omitted.

Figure 13:
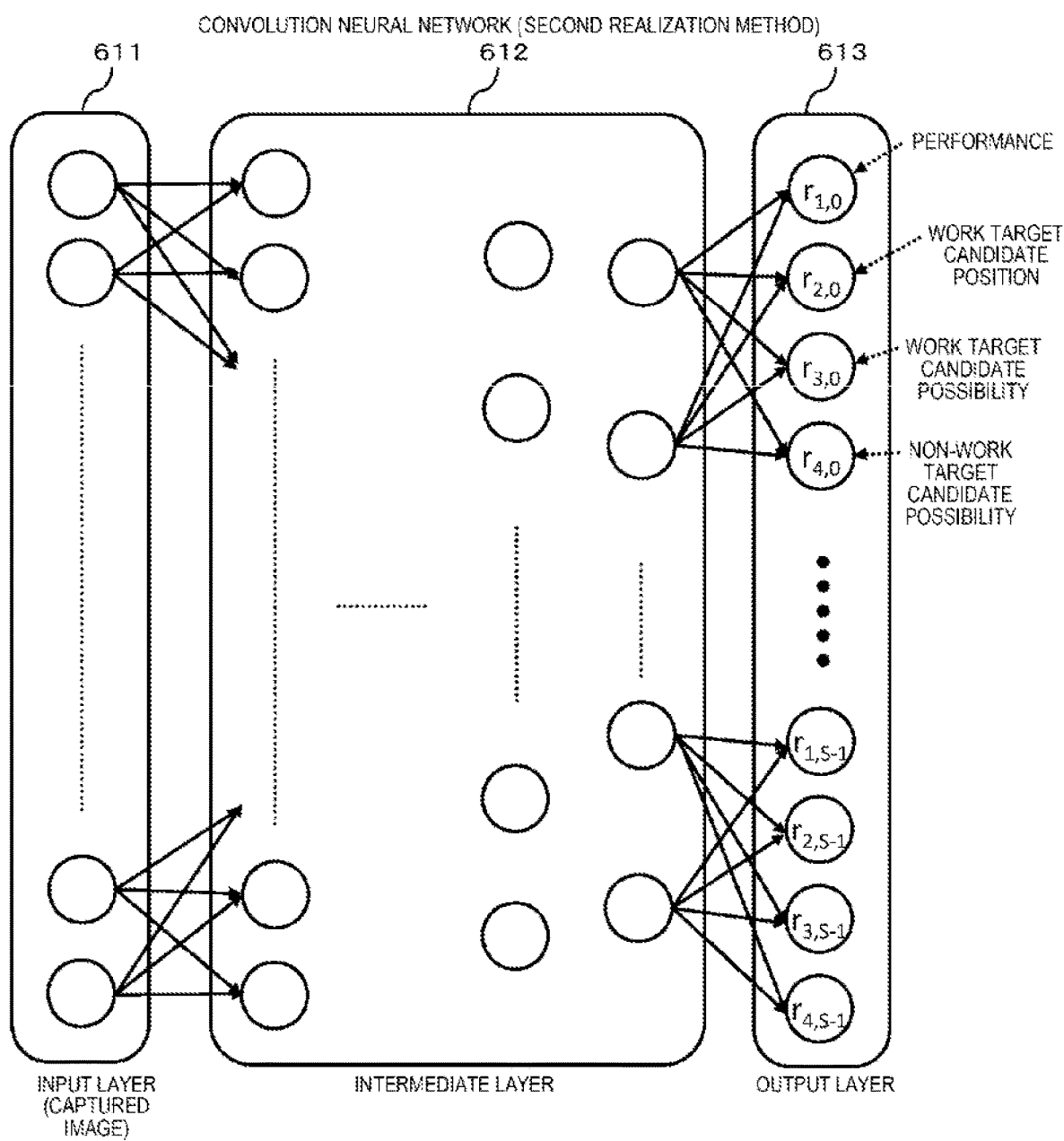
FIG. 13 is a view for explaining a convolution neural network used for a second realization method of recognition processing.

FIG. 13 is a view for explaining a structure of a convolution neural network used in the second realization method. A captured image is input to the input layer 611 of the convolution neural network. The intermediate layer 612 includes a plurality (for example, approximately 20 layers) of convolution layers. The intermediate layer 612 obtains each predicted value of the performance $r_{1,0}$, the work target candidate position $r_{2,0}$, the work target candidate possibility $r_{3,0}$, the non-work candidate possibility $r_{4,0}$ and the like in the output layer 613.

Figure 14:
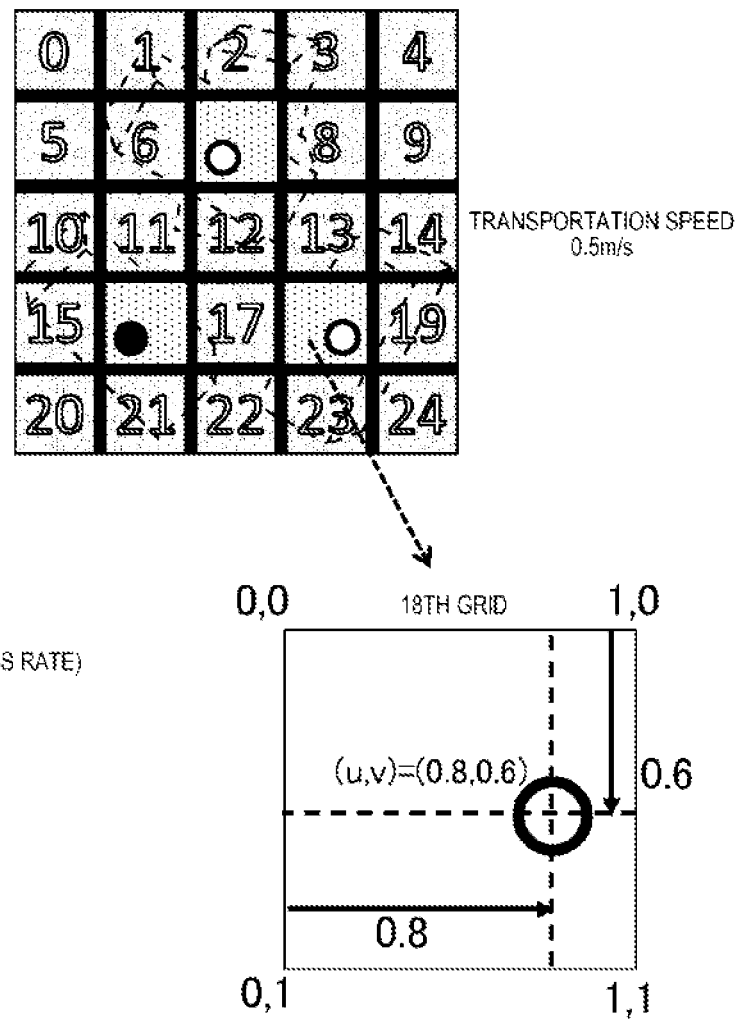
FIG. 14 is a view illustrating another specific example of the output layer in the case where the captured image is divided into grids.

FIG. 14 illustrates a specific example of the output layer 613 in the second realization method. In the FIG. 14, (u, v) is a coordinate indicating the position in the grid. The center of the circle illustrated in the grid indicates the gripping point position of the work target candidate. The color of the circle represents performance (work success rate). In this example, the transportation speed of the transport machine 30 is fixed at 0.5 m/s.

Similar to the first realization method, when generating the learning model 462, the learning model generation unit 422 specifies the learning data 461 whose difference from the predicted value obtained by the intermediate layer 612 is, for example, within an allowable range, gives the predicted value of the specified learning data 461 to the integrated difference value L, and updates the parameter of each layer of the intermediate layer 612 in the direction of decreasing a value of the total difference value L, thereby generating the learning model 462. Update of the parameters described above may be performed by, for example, a stochastic gradient descent method or an error back propagation method. An example of the method of calculating the total difference value L used in generating the learning model 462 (including parameter of each layer of the intermediate layer 612) in the second realization method will be described below.

$$L = \frac{1}{B}\sum_{i=0}^{B-1} \Lambda_i \quad (3)$$

L . . . total difference value
B . . . number of captured images of learning data
i. identifier of captured image 0 to B−1
Λi difference value by image of captured image i $$\Lambda_i = \sum_{j=0}^{S-1} A_{ij}^{loc}(R_{ij} - \widetilde{R_{ij}}) + \lambda_{noloc}\sum_{j=0}^{S-1}(1 - A_{ij}^{loc})(R_{ij} - \widetilde{R_{ij}}) + \quad (4)$$

$$\lambda_{coord}\sum_{j=0}^{S-1}\langle A_{ij}^{loc}\{(u_{ij} - \widetilde{u_{ij}})^2 + (v_{ij} - \widetilde{v_{ij}})^2\}\rangle - \sum_{j=0}^{S-1}\sum_{k=0}^{K-1} t_{ijk}\log p_{ijk}$$

S . . . number of grids
j . . . identifier of grid 0 to S−1
K=2 . . . number of grid classes
k . . . number of classes
0: work target candidate
1: non-work target candidate
$R_{ij}$ . . . performance $r_1$ (predicted result)
$\widetilde{R_{ij}}$ . . . performance $r_1$ (learning data)
$u_{ij}, v_{ij}$ . . . work target candidate position $r_2$ (predicted result)
$\widetilde{u_{ij}}, \widetilde{v_{ij}}$ . . . work target candidate position $r_2$ (learning data)
$P_{ij0}$ . . . work target candidate possibility (predicted result)
$P_{ij1}$ . . . non-work target candidate possibility (predicted result)
$t_{ij0}$ . . . work target candidate possibility (learning data)
$t_{ij1}$ . . . non-work target candidate possibility (learning data)
$A_{ij}^{loc}=t_{ij0}$ . . . 0: non-work target candidate, 1: work target candidate (learning data)
$\lambda_{noloc}$ . . . degree of importance of performance prediction in non-work target candidate
$\lambda_{coord}$ . . . degree of importance of work target candidate position Each degree of importance is a relative value when the degree of importance of the transport machine control parameter in the work target candidate is set to 1.

The configurations of expressions (3) and (4) are similar to expressions (1) and (2) in the first realization method, but in the second realization method, the total difference value L and the image specific difference value by image $\Lambda_i$ in the expression (3) are defined for each transport machine parameter which is a fixed value. In the second realization method, the "transport machine optimum control parameter $r_1$" in the expression (2) of the first realization method is "performance $r_1$" and the "degree of importance of the transport machine control parameter prediction in the non-work target candidate" in the expression (2) is the "degree of importance of performance prediction in the non-work target candidate".

Figure 15:
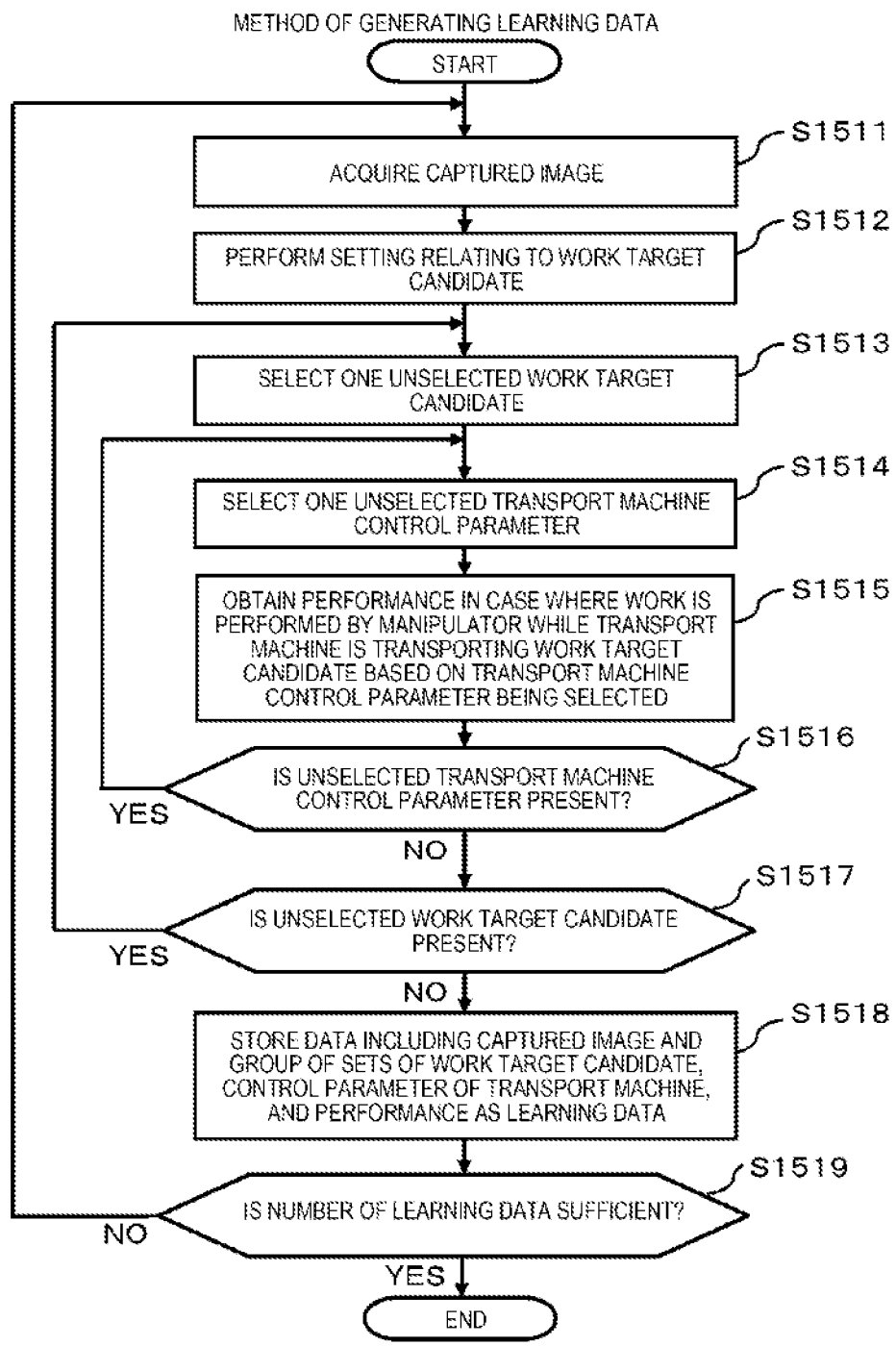
FIG. 15 is a flowchart illustrating a method of generating learning data in the second realization method.

FIG. 15 is a flowchart illustrating a method of generating the learning data 461 in the second realization method. Hereinafter, a method of generating the learning data 461 in the second realization method will be described with reference to FIG. 15.

First, the user acquires a captured image by capturing the box 2 in which a plurality of articles 5 are accommodated from the upper opening side of the box 2 by the capturing device 40 (S1511).

Subsequently, while displaying the captured image on the output device 150, the learning data generation unit 421 receives an input (designation) of setting (setting of the gripping point position of the article 5 in the first example, setting of the screw hole position in the second example) relating to the work target candidate from the user via the input device 140 while displaying the captured image on the output device 150 (S1512).

In the subsequent S1513, the learning data generation unit 421 selects one unselected work target candidate in this processing (S1513).

In the subsequent step S1514, the learning data generation unit 421 selects one unselected transport control parameter in the processing (S1514). It is assumed that the information processing apparatus 10 stores a plurality of selectable transport machine control parameters (for example, the transportation speed (0.1 m/s, 0.2 m/s, 1.0 m/s, and the like) of the transport machine 30 and the moving route (the distances from the manipulator 20 such as 10 cm, 15 cm, . . . , 25 cm, and the like) of the transport machine in advance.

Subsequently, the learning data generation unit 421 obtains the performance when the work is performed by the manipulator 20 while the transport machine 30 is moving (while transporting the work target candidate) based on the transport machine control parameter being selected (S1515). The performance when work is performed with the manipulator 20 is, for example, the work success rate, and can be obtained as a success rate of the operation plan by performing the operation plan of the manipulator 20 for performing the work a plurality of times by the method (dynamic RRT) disclosed in H. Deng, Z. Xia and J. Xiong, "Robotic Manipulation Planning Using Dynamic RRT," Proc. of The 2016 IEEE Int. Conf. on Real-time Computing and Robotics, pp. 500-504, 2016.

Subsequently, the learning data generation unit 421 determines whether or not an unselected transport machine control parameter is present in S1514. When it is determined that the unselected transport machine control parameter is present (YES in S1516), the processing returns to S1514 to select another unselected transport machine control parameter. When it is determined that an unselected transport machine control parameter is not present (NO in S1516), the processing proceeds to S1517.

Subsequently, the learning data generation unit 421 determines whether or not an unselected work target candidate is present in S1513 (S1517). When it is determined that the unselected transport machine control parameter is present (YES in S1517), the processing returns to S1513 to select another unselected transport machine control parameter. When it is determined that an unselected transport machine control parameter is not present (NO in S1517), the processing proceeds to S1518.

In step S1518, the learning data generation unit 421 stores, as learning data 461, data including the captured image acquired in step S1511 and a combination of the position of the work target candidate and the performance of each of the work target candidates.

In the subsequent step S1519, it is determined whether or not the user can acquire a sufficient number of learning data (S1519). When the user determines that a sufficient number of learning data cannot be acquired (NO in S1519), the processing returns to S1511. When the user determines that a sufficient number of learning data can be acquired (YES in S1519), the generation of the learning data is ended.

The intermediate layer 612 may be configured to further obtain the control parameter (hereinafter, referred to as manipulator control parameter) $r_{5,0}$ of the manipulator 20 as the element of the output layer 613, for example. In this case, for example, a loop similar to the loop of S1514 to S1518 is also performed for the manipulator control parameter (for example, positions (0 cm, ±5 cm, ±10 cm, . . . , ±25 cm, and the like) in the moving direction of the transport machine 30 as seen from the manipulator 20 at the moment when the manipulator 20 grips the work target). In that case, in S1518, the learning data generation unit 421 stores data including the captured image and a combination of the position of the work target candidate, the performance of each of the work target candidates, and the manipulator control parameters as the learning data 461.

Figure 16:
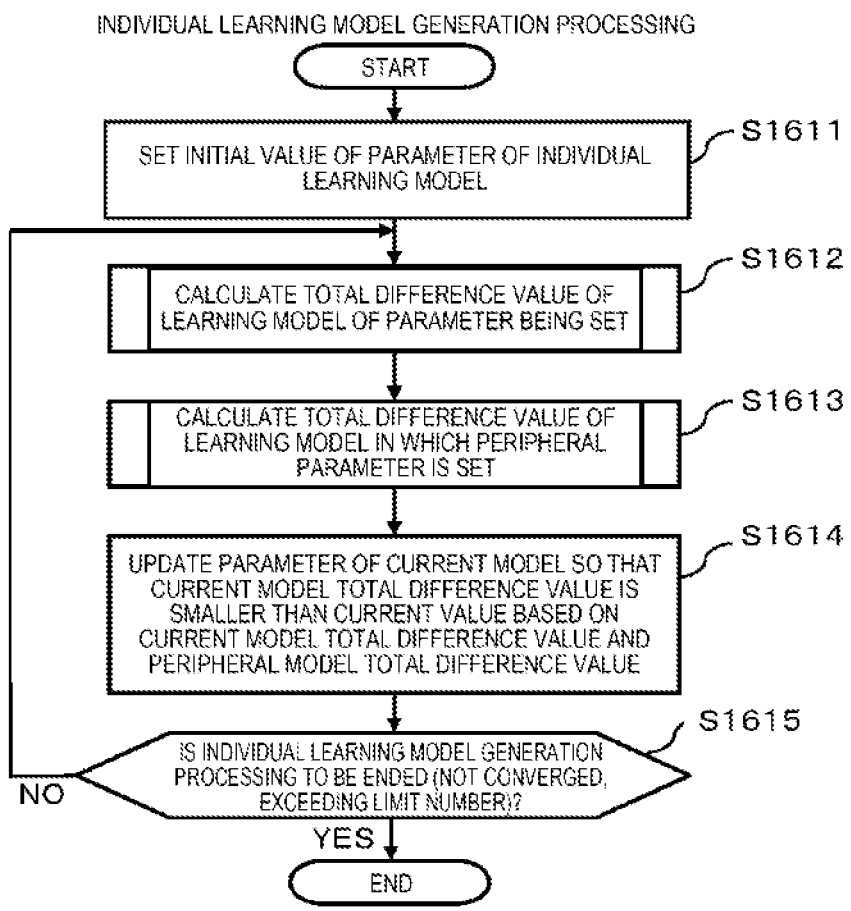
FIG. 16 is a flowchart for explaining individual learning model generation processing in the second realization method.

FIGS. 16 and 17 are flowcharts for explaining generation processing of the learning model 462 in the second realization method (hereinafter, referred to as individual learning model generation processing). Hereinafter, individual learning model generation processing will be described together with FIGS. 16 and 17.

As illustrated in FIG. 16, firstly, the learning model generation unit 422 sets an initial value (initial value with fixed transport machine control parameters) of parameters of the learning model (intermediate layer 612) (S1611).

Subsequently, the learning model generation unit 422 obtains a total difference value (hereinafter, referred to as a current model total difference value) to be described below on a learning model of a parameter currently set (hereinafter, referred to as a current model) (S1612).

Subsequently, the learning model generation unit 422 obtains a total difference value (hereinafter, referred to as a peripheral model total difference value) for a learning model (hereinafter, referred to as a peripheral model) in which parameters on the periphery of the parameter currently set (S1613).

Subsequently, the learning model generation unit 422 updates the parameters of the current model so that the current total model difference value is smaller than the current value based on the current model total difference value and the peripheral model total difference value obtained in S1612 (S1614).

In the subsequent S1615, the learning model generation unit 422 determines whether or not to end the individual learning model generation processing. When it is determined that the learning model generation unit 422 does not end the individual learning model generating processing (NO in S1615), the processing returns to S1612 and processing from S1612 is performed on the current model of the updated parameters. When it is determined that the learning model generation unit 422 ends the individual learning model generating processing (YES in S1615), the learning model generation unit 422 stores the finally generated learning model as the learning model 462 and ends the individual learning model generating processing. For example, in a case where the current total model differential value does not converge even if the parameter is updated in S1614 (when a decrease amount of the total difference value becomes equal to or less than the threshold value) and a case where the number of repetitive executions of the loop of S1612 to S1615 reaches the number of times which is set in advance), the learning model generation unit 422 determines to end the learning model generation processing.

FIG. 17 is a flowchart for explaining the processing in S1612 or S1613 (processing for obtaining the current model total difference value or peripheral model total difference value, hereinafter referred to as total difference value calculation processing) of the individual learning model generation processing in FIG. 16.

First, the learning model generation unit 422 selects one unselected captured image among the captured images included in the learning data 461 (S1711).

The learning model generation unit 422 gives the captured image selected in S1711 to the input layer 611 by using the model (current model or peripheral model) of the parameter being set (the parameter of the current model in a case where the caller of the total difference value calculation processing is S1612 and the parameters of the peripheral model in a case where the caller of the total difference value calculation processing is S1613) and predicts a plurality of sets of the work target candidate and the transport machine optimum control parameter (S1712).

Subsequently, the learning model generation unit 422 obtains a difference value between the predicted result and the learning data 461 of the captured image being selected for each set of the predicted work target candidate and the performance (S1713).

Subsequently, the learning model generation unit 422 determines whether or not an unselected captured image is present in S1711 (S1714). When it is determined that the unselected captured image is present (YES in S1714), the learning model generation unit 422 selects the captured image of the other learning data and repeats processing from S1711. When it is determined that an unselected captured image is not present (NO in S1714), the learning model generation unit 422 calculates a total difference value for the current recognition processing parameter based on the difference values by each image for all imaging results (S1715). The learning model generation unit 422 than ends the total difference value calculation processing, and the processing proceeds to processing following the processing of S1612 or S1613 of the learning model generating processing of FIG. 16.

As described above, in a case where the intermediate layer 612 is configured to further obtain the performance $r_{5,0}$ as the element of the output layer 613, for example, processing similarly to that of S1612 and S1613 performed for the performance is performed for each manipulator optimum control parameter as well.

By the way, in the second realization method of recognition processing described above, a learning model in which the transport machine control parameter is fixed is used, but similarly to this, for example, a learning model in which the manipulator control parameter is fixed may be used. In that case, the learning model 462 is prepared for each discrete value of the manipulator control parameter, and the captured image is input to each learning model 462, and the work target candidate position and the performance are output as one of the recognition results. Among the output results, the manipulator control parameter of the learning model 462 from which the work target candidate having the maximum performance is obtained becomes the manipulator optimum control parameter.

Also, the learning model 462 may be generated by using elements (transportation speed, work success rate, and the like) of performance as the output layer 603 and performance may be determined based on the elements (for example, by multiplying the transportation speed and the work success rate) described above.

The model of the convolution neural network is used in the above embodiment, but is not limited to the model of the convolution neural network as long as it is a model with supervised learning. For example, a configuration in which machine learning is performed by, for example, a support vector machine or another model of random forest may be adopted.

As described above, according to the robot work system 1 of this embodiment, when performing work with the manipulator 20 (robot) using the transport machine 30, the performance of the work as a whole of the robot work system 1 can be improved in consideration of the operation of the transport machine 30.

By the way, the present invention is not limited to the embodiments described above, but includes various modification examples and equivalent structures within the scope of appended claims. For example, the embodiments described above have been described in detail in order to easily explain the present invention, and the present invention is not limited to the embodiment having all the configurations described. A part of the configuration of a certain embodiment may be replaced by the configuration of another embodiment. Further, the configuration of another embodiment may be added to the configuration of the certain embodiment. In addition, other configurations may be added, deleted, or replaced with a part of the configuration of each embodiment.

Further, the configurations, functions, processing units, processing means, and the like described above may be realized by hardware, for example, by designing some or all of them with an integrated circuit or the like, and the configurations, functions, processing units, processing means, and the like may be realized by software by the processor interpreting and executing the program realizing the respective functions.

Information such as a programs, a table, a file, and the like that realize each function can be stored in a storage device such as a memory, a hard disk, a solid state drive (SSD), or a recording medium such as an integrated circuit (IC) card, an SD card, a digital versatile disc (DVD).

In addition, control lines and information lines indicate what is considered to be necessary for the explanation, and do not necessarily indicate all control lines and information lines necessary for mounting. In fact, it may be considered that almost all configurations are interconnected.

Although the present disclosure has been described with reference to example embodiments, those skilled in the art will recognize that various changes and modifications may be made in form and detail without departing from the spirit and scope of the claimed subject matter.

What is claimed is:

1. A robot work system in which a robot performs work on a work target transported by a transport machine, comprising:
    an information processing apparatus that includes a processor and a storage device,
    wherein the information processing apparatus comprises
        a recognition processing unit that obtains a plurality of combinations of a position of a work target candidate and a transport machine optimum control parameter which is a control parameter of the transport machine that maximizes performance of the work on a work target when the work target candidate is set as the work target, based on a captured image obtained by capturing an area including a plurality of the work target candidates transported by the transport machine,
        a work target determination unit that determines a work target from among the work target candidates based on the combinations,
        a transport machine control unit that controls the transport machine based on the transport machine optimum control parameter of the determined work target, and
        a robot control plan generation unit that generates a control plan of the robot based on a position of the determined work target and the transport machine optimum control parameter of the work target, and
    the recognition processing unit, the work target determination unit, the transport machine control unit, and the robot control plan generation unit are realized by reading out and executing a program stored in the storage device by the processor;
    wherein the recognition processing unit is realized by a learning model generated by machine learning of learning data with the captured image which is acquired by capturing the area including the plurality of work target candidates, as an input and a combination of the position of the work target candidate and the performance when the control parameter of the transport machine is fixed, as an output; and
    wherein the recognition processing unit is realized by a plurality of the learning models prepared for each discrete value of the control parameter of the transport machine.

2. The robot work system according to claim 1,
    wherein the work target determination unit determines the work target candidate having a maximum performance among the combinations as the work target.

3. The robot work system according to claim 1,
    wherein the performance is at least one of a transportation speed of the transport machine, a success rate of the work, and a value obtained by multiplying the transportation speed and the success rate.

4. The robot work system according to claim 1,
    wherein the combination of the position of the work target candidate and the performance when the control parameter of the transport machine is fixed further includes the transport machine optimum control parameter.

5. The robot work system according to claim 4,
    wherein the learning model is configured using a convolution neural network, and
    an intermediate layer of the learning model outputs the positions of the plurality of work target candidates and the respective transport machine optimum control parameters of the work target candidates by receiving the captured image as an input.

6. The robot work system according to claim 4,
    wherein the learning model is configured using a convolution neural network, and
    an intermediate layer of the learning model outputs the positions of the plurality of work target candidates, the respective transport machine optimum control parameters of the work target candidates, and the performance by receiving the captured image as an input.

7. The robot work system according to claim 1,
    wherein the combination of the position of the work target candidate, the transport machine optimum control parameter of the work target candidate, and the performance further includes a robot optimum control parameter which is a control parameter of the robot that maximizes the performance.

8. The robot work system according to claim 7,
    wherein the learning model is configured using a convolution neural network, and
    an intermediate layer of the learning model outputs the positions of the plurality of work target candidates, the respective transport machine optimum control parameters of the work target candidates, the performance, and the robot optimum control parameter by receiving the captured image as an input.

9. The robot work system according to claim 1,
wherein the combination of the position of the work target candidate and the performance of the work target candidate further includes a robot optimum control parameter which is a control parameter of the robot that maximizes the performance when the control parameter of the transport machine is fixed.

10. A robot work system in which a robot performs work on a work target transported by a transport machine, comprising:
an information processing apparatus that includes a processor and a storage device,
wherein the information processing apparatus comprises
a recognition processing unit that obtains a plurality of combinations of a position of a work target candidate and a transport machine optimum control parameter which is a control parameter of the transport machine that maximizes performance of the work on a work target when the work target candidate is set as the work target, based on a captured image obtained by capturing an area including a plurality of the work target candidates transported by the transport machine,
a work target determination unit that determines a work target from among the work target candidates based on the combinations,
a transport machine control unit that controls the transport machine based on the transport machine optimum control parameter of the determined work target, and
a robot control plan generation unit that generates a control plan of the robot based on a position of the determined work target and the transport machine optimum control parameter of the work target, and
the recognition processing unit, the work target determination unit, the transport machine control unit, and the robot control plan generation unit are realized by reading out and executing a program stored in the storage device by the processor;
wherein the recognition processing unit is realized by a learning model of machine learning obtained by learning of learning data with the captured image which is acquired by capturing the area including the plurality of work target candidates, as an input and a combination of the position of the work target candidate and a performance when a robot optimum control parameter which is a control parameter of the robot that maximizes the performance is fixed as an out but:
wherein the recognition processing unit is realized by a plurality of the learning models prepared for each discrete value of the control parameter of the robot.

11. A method of controlling a robot work system in which a robot performs work on a work target transported by a transport machine, comprising:
by an information processing apparatus including a processor and a storage device,
obtaining a plurality of combinations of a position of a work target candidate and a transport machine optimum control parameter that is a control parameter of the transport machine that maximizes performance of the work on a work target when the work target candidate is set as the work target, based on a captured image obtained by capturing an area including a plurality of the work target candidates transported by the transport machine;
determining the work target from among the work target candidates based on the combinations;
controlling the transport machine based on the transport machine optimum parameter of the determined work target; and
generating a control plan of the robot based on a position of the determined work target and the transport machine optimum control parameter of the work target;
wherein the steps of the method are realized by a learning model generated by machine learning of learning data with the captured image which is acquired by capturing the area including the plurality of work target candidates, as an input and a combination of the position of the work target candidate and the performance when the control parameter of the transport machine is fixed, as an output; and
wherein a plurality of the learning models are prepared for each discrete value of the control parameter of the transport machine.

* * * * *